(12) United States Patent
Guan et al.

(10) Patent No.: US 11,843,439 B2
(45) Date of Patent: *Dec. 12, 2023

(54) COMMUNICATION METHOD, TERMINAL DEVICE, AND NETWORK DEVICE

(71) Applicant: Huawei Technologies Co., Ltd., Guangdong (CN)

(72) Inventors: Peng Guan, Shenzhen (CN); Xi Zhang, Chengdu (CN); Min Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,710

(22) Filed: May 3, 2022

(65) Prior Publication Data

US 2022/0337302 A1 Oct. 20, 2022

Related U.S. Application Data

(63) Continuation of application No. 17/247,007, filed on Nov. 24, 2020, now Pat. No. 11,336,360, which is a
(Continued)

(30) Foreign Application Priority Data

May 25, 2018 (CN) .......................... 201810532030.5

(51) Int. Cl.
*H04B 7/08* (2006.01)
*H04B 7/06* (2006.01)
(Continued)

(52) U.S. Cl.
CPC ........... *H04B 7/0695* (2013.01); *H04B 7/043* (2013.01); *H04B 7/0628* (2013.01); *H04B 7/088* (2013.01); *H04B 17/309* (2015.01)

(58) Field of Classification Search
CPC .... H04B 7/0695; H04B 7/043; H04B 7/0628; H04B 7/088; H04B 17/309; H04B 17/327;
(Continued)

(56) References Cited

U.S. PATENT DOCUMENTS 11,088,750 B2 8/2021 Zhou et al.
11,336,360 B2 * 5/2022 Guan .................... H04L 5/0091
(Continued)

FOREIGN PATENT DOCUMENTS

CN 206441872 U 8/2017
CN 107733473 A 2/2018
(Continued)

OTHER PUBLICATIONS

3GPP TS 38.211 V15.0.0 (Dec. 2017);3rd Generation Partnership Project; Technical Specification Group Radio Access Network;NR; Physical channels and modulation(Release 15),total 73 pages.
(Continued)

*Primary Examiner* — Kenneth T Lam
(74) *Attorney, Agent, or Firm* — WOMBLE BOND DICKINSON (US) LLP

(57) ABSTRACT

This application provides a communication method, a terminal device, and a network device. The method includes: using, by a terminal device, a first receive parameter to receive control information sent by a network device, where the control information is used to indicate a second receive parameter used by the terminal device to receive a to-be-transmitted signal; determining, by the terminal device based on a first antenna panel to which the first receive parameter belongs and a second antenna panel to which the second receive parameter belongs, a beam switching time required for switching from the first receive parameter to the second receive parameter; and receiving, by the terminal
(Continued)

device, the to-be-transmitted signal based on the beam switching time.

20 Claims, 6 Drawing Sheets

Related U.S. Application Data continuation of application No. PCT/CN2019/088003, filed on May 22, 2019.

(51) Int. Cl.
  *H04B 17/309* (2015.01)
  *H04B 7/0426* (2017.01)

(58) Field of Classification Search
  CPC ... H04B 7/0404; H04B 7/0691; H04L 5/0023; H04L 5/0085; H04L 5/0048; H04L 5/0091; H04L 5/0053; H04W 72/046; H04W 72/23
  See application file for complete search history.

(56) References Cited

U.S. PATENT DOCUMENTS

| | | | |
|---|---|---|---|
| 2018/0145742 A1 | 5/2018 | Li et al. | |
| 2018/0227031 A1 | 8/2018 | Guo et al. | |
| 2019/0260458 A1 | 8/2019 | Zhou et al. | |
| 2019/0357193 A1 | 11/2019 | Bai et al. | |
| 2020/0029274 A1 | 1/2020 | Cheng et al. | |
| 2020/0099422 A1* | 3/2020 | Osawa | H04B 7/0695 |
| 2020/0107327 A1 | 4/2020 | Wang et al. | |
| 2020/0178134 A1 | 6/2020 | Yang et al. | |
| 2020/0245173 A1* | 7/2020 | Kusashima | H04B 7/088 |
| 2020/0374960 A1* | 11/2020 | Deenoo | H04W 74/0833 |

FOREIGN PATENT DOCUMENTS

| | | |
|---|---|---|
| CN | 107733484 A | 2/2018 |
| CN | 108024274 A | 5/2018 |
| WO | 2014091221 A1 | 6/2014 |
| WO | 2017009633 A1 | 1/2017 |
| WO | 2017192889 A1 | 11/2017 |

OTHER PUBLICATIONS

3GPP TS 38.212 V15.0.0 (Dec. 2017);3rd Generation Partnership Project; Technical Specification Group Radio Access Network;NR; Multiplexing and channel coding(Release 15);total 82 pages.
3GPP TS 38.213 V15.0.0 (Dec. 2017);3rd Generation Partnership Project; Technical Specification Group Radio Access Network;NR; Physical layer procedures for control(Release 15); total 56 pages.
3GPP TS 38.331 V15.0.0 (Dec. 2017);3rd Generation Partnership Project; Technical Specification Group Radio Access Network;NR; Radio Resource Control (RRC) protocol specification(Release 15);total 188 pages.
Huawei, HiSilicon, On beam switching delay. 3GPP TSG-RAN WG4 Meeting #86bis, Melbourne, Australia, Apr. 16-20 J018, R4-1804681, 2 pages.
Qualcomm Incorporated, NR Features and Capabilities. 3GPP TSG RAN WG1 Meeting 93, Busan, Korea, May 21 J5th, 2018 , R1-1807616, 16 pages.
Vivo, Remaining issues on beam measurement and reporting. 3GPP TSG RAN WG1 Meeting #93, Busan, Korea, May J1st 25, 2018, R1-1806044, 5 pages.
3GPP TSG-RAN WG4 Meeting #86bis R4-1804681, Huawei, Melbourne, Australia, Apr. 16-20, 2018 (Year: 2018).

* cited by examiner

COMMUNICATION METHOD, TERMINAL DEVICE, AND NETWORK DEVICE

CROSS-REFERENCE TO RELATED APPLICATIONS

This application is a continuation of U.S. patent application Ser. No. 17/247,007, filed on Nov. 24, 2020, which is a continuation of International Application No. PCT/CN2019/088003, filed on May 22, 2019, which claims priority to Chinese Patent Application No. 201810532030.5, filed on May 25, 2018. All of the afore-mentioned patent applications are hereby incorporated by reference in their entireties.

TECHNICAL FIELD

This application relates to the communications field, and more specifically, to a communication method, a terminal device, and a network device.

BACKGROUND

In the prior art, when a network device schedules a terminal device, the network device indicates, to the terminal device by using downlink control information (DCI) in a physical downlink control channel (PDCCH), a time-frequency resource position of a physical downlink shared channel (PDSCH) and a receive beam used by the terminal device to receive the PDSCH. If the terminal device determines that a time interval between the PDCCH and the PDSCH is greater than or equal to a threshold, the terminal device receives the PDSCH by using the receive beam indicated by the DCI. If the terminal device determines that the time interval between the PDCCH and the PDSCH is less than the threshold, the terminal device receives the PDSCH by using a default beam. The threshold is determined based on a capability of decoding the DCI and a beam switching capability. A beam switching time required by the terminal device includes {14 symbols, 28 symbols}.

The beam switching time is a time required for switching between two beams on one antenna panel. With development of technologies, most existing and future terminal devices are equipped with a plurality of antenna panels. Switching between antenna panels may require more time. Therefore, how the terminal device accurately receives a to-be-transmitted signal in a case in which the terminal device is equipped with a plurality of antenna panels becomes an urgent problem to be resolved.

SUMMARY

This application provides a communication method, so that a terminal device can receive a to-be-transmitted signal more accurately.

According to a first aspect, a communication method is provided. The method includes: receiving, by a terminal device by using a first receive parameter, control information sent by a network device, where the control information is used to indicate a second receive parameter, and the second receive parameter is used by the terminal device to receive a to-be-transmitted signal; determining, by the terminal device based on an antenna panel to which the first receive parameter belongs and an antenna panel to which the second receive parameter belongs, a beam switching time required for switching from the first receive parameter to the second receive parameter; and receiving, by the terminal device, the to-be-transmitted signal based on the beam switching time.

It should be understood that a "receive parameter" in this application may be understood as a "receive beam", and the receive beam is a receive beam of the terminal device. A reference signal resource in the following may be understood as a "transmit beam" of the network device. The terminal device and the network device communicate with each other by using beams, and the terminal device may determine a corresponding receive beam based on a transmit beam of the network device. Therefore, during downlink scheduling transmission, the network device may indicate, to the terminal device, a receive beam of the terminal device by sending, to the terminal device, beam indication information of a transmit beam of the network device or beam indication information of the receive beam of the terminal device. Therefore, "A indicates a receive parameter" and "A indicates a transmit beam" are equivalent concepts. For example, that the control information is used to indicate the second receive parameter and that the control information is used to indicate a second transmit beam are equivalent concepts. Herein, the second receive parameter corresponds to the second transmit beam. When the network device performs sending by using the second transmit beam, the terminal device performs receiving by using the second receive parameter. The beam indication information may be an identifier, an index, or the like of a beam. For details, refer to descriptions in the following specific embodiments. Details are not described herein.

It should be noted that, in this application, that the terminal device switches from the first receive beam to the second receive beam means that the terminal device receives the control information, obtains the second receive beam by decoding the control information, and switches to the second receive beam. In other words, the beam switching time described in this application includes a time required by the terminal device to decode the control information and a time required by the terminal device to perform beam switching after the control information is decoded.

According to the communication method provided in this application, the terminal device does not consider that a beam switching time required for switching between any two receive beams of the terminal device is the same, and receives the to-be-transmitted signal based on the beam switching time. Instead, the terminal device needs to determine the beam switching time based on whether the two receive beams belong to a same antenna panel, and receives the to-be-transmitted signal based on the switching time. Because a beam switching time required for switching between any two beams on a same antenna panel is different from a beam switching time required for switching between any two beams on different antenna panels, compared with the prior art, the terminal device can receive the to-be-transmitted signal more accurately based on a beam switching time.

In an embodiment, before the receiving, by a terminal device by using a first receive parameter, control information sent by a network device, the method further includes:

receiving, by the terminal device, reference signals sent by the network device by using one or more reference signal resources;

determining, by the terminal device based on measurement of the reference signals, one or more target reference signal resources and a plurality of receive parameters corresponding to the one or more target reference signal resources, and determining one or more antenna panels that is of the terminal device and that separately corresponds to the plurality of receive parameters, where the one or more target reference signal resources are a part or all of the one or more reference signal resources, and the plurality of receive parameters include the first receive parameter and the second receive parameter; and sending, by the terminal device, beam measurement information to the network device, where the beam measurement information is used to indicate the one or more target reference signal resources and the one or more antenna panels that is of the terminal device and that separately corresponds to the one or more target reference signal resources.

Specifically, the terminal device may determine and obtain one or more better transmit beams (namely, one or more target transmit beams) of the network device by measuring the reference signals on the one or more transmit beams of the network device. For example, the terminal device may select one or more transmit beams with relatively large reference signal receiving powers (RSRP) of the transmit beams as the one or more better transmit beams. In addition, the terminal device measures a same transmit beam of the network device by using different receive beams, to obtain a plurality of better receive beams. Therefore, a plurality of beam pairs (one beam pair includes one transmit beam of the network device and one receive beam of the terminal device) with better communication can be obtained. Herein, transmit beams of the network devices that are included in different beam pairs in the plurality of beam pairs may be the same or may be different, and receive beams of the terminal device that are included in different beam pairs in the plurality of beam pairs may be the same or may be different. In other words, one transmit beam may correspond to a plurality of receive beams, or a plurality of transmit beams may correspond to one receive beam, or transmit beams and receive beams have a one-to-one correspondence.

The receive beams of the terminal device in the plurality of beam pairs may belong to different antenna panels. In addition, in this embodiment of this application, the terminal device may maintain a correspondence among a transmit beam of the network device, a receive beam of the terminal device, and an antenna panel of the terminal device. After obtaining the plurality of better transmit beams of the network device, the terminal device may feed back beam measurement information of the plurality of better transmit beams to the network device. The beam measurement information is used to indicate the transmit beam and an antenna panel, of the terminal device, corresponding to the transmit beam. The beam measurement information may include an index of the transmit beam and an index of the antenna panel, of the terminal device, corresponding to the transmit beam. Further, the beam measurement information may include an index of a receive beam, of the terminal device, corresponding to the transmit beam. It should be understood that the antenna panel, of the terminal device, corresponding to the transmit beam is an antenna panel to which the receive beam corresponding to the transmit beam belongs. In addition, the beam measurement information may alternatively include an RSRP of the transmit beam. However, this is not limited in this embodiment of this application.

Therefore, based on the beam measurement information fed back by the terminal device, the network device can determine antenna panels, of the terminal device, to which the first receive beam and the second receive beam separately belong, or can determine whether the first receive beam and the second receive beam belong to a same antenna panel of the terminal device.

It should be understood that a receive beam corresponds to a transmit beam. Therefore, that the network device determines the antenna panels, of the terminal device, to which the first receive beam and the second receive beam separately belong may also be described as follows: The network device determines antenna panels, of the terminal device, separately corresponding to a first transmit beam and the second transmit beam.

It should be understood that the reference signal resource may be a CSI-RS resource (resource). However, this is not limited in this embodiment of this application. The reference signal resource may be represented by using an index (or a number, or an identifier (ID)) of the reference signal resource, an index of a CSI-RS resource set, or an index of a CSI-RS resource configuration. The reference signal may be a CSI-RS, a synchronization signal, a broadcast channel, a broadcast channel demodulation reference signal, a synchronization signal block, a control channel demodulation reference signal, a data channel demodulation reference signal, a phase tracking reference signal (PTRS), or the like. This is not limited in this embodiment of this application.

In an embodiment, after determining the plurality of beam pairs described above, the terminal device may explicitly feed back indexes of the plurality of transmit beams and indexes of corresponding antenna panels of the terminal device. For example, the beam measurement information fed back by the terminal device may be in the following form:

{transmit beam #1, antenna panel #1, . . . }; {transmit beam #2, antenna panel #2, . . . }; {transmit beam #3, antenna panel #3, . . . }; and {transmit beam #4, antenna panel #4, . . . }.

It should be understood that the ellipsis herein indicates that the terminal device may further feed back other information in addition to the index of the transmit beam and the index of the antenna panel, for example, beam quality of the transmit beam, including an RSRP, a received signal strength indicator (RSSI), reference signal received quality (RSRQ), a signal to interference plus noise ratio (SINR), a channel quality indicator (CQI), a rank indicator (RI), a precoding matrix indicator (PMI), or the like.

In another embodiment, after determining the plurality of beam pairs described above, the terminal device may feed back the antenna panel, of the terminal device, corresponding to the transmit beam by feeding back group information of the transmit beam. For example, the terminal device may classify beams received on a same antenna panel into one group. The beam measurement information fed back by the terminal device may be in the following form:

{group #1, transmit beam #1, transmit beam #2, . . . }; and {group #2, transmit beam #3, transmit beam #4, . . . }.

Based on the group information fed back by the terminal device, the network device may determine that antenna panels, of the terminal device, corresponding to the transmit beam #1 and the transmit beam #2 are one antenna panel, and antenna panels, of the terminal device, corresponding to the transmit beam #3 and the transmit beam #4 are another antenna panel.

It should be understood that the ellipsis herein indicates that the terminal device may further feed back other information in addition to the index of the transmit beam and the index of the antenna panel, for example, beam quality of the transmit beam, including an RSRP, RSRQ, an RSSI, an SINR, a CQI, an RI, a PMI, or the like.

In an embodiment, the terminal device may alternatively classify beams received on different antenna panels into one group. The beam measurement information fed back by the terminal device may be in the following form:

{group #1, transmit beam #1, transmit beam #3, . . . }; and
{group #2, transmit beam #2, transmit beam #4, . . . }.

Based on the group information fed back by the terminal device, the network device may determine that antenna panels, of the terminal device, corresponding to the transmit beam #1 and the transmit beam #3 are different, and antenna panels, of the terminal device, corresponding to the transmit beam #2 and the transmit beam #4 are different.

In an embodiment, the terminal device may alternatively report beams received on a same antenna panel in one time of reporting. The terminal device reports beams received on different antenna panels in different times of reporting. The beam measurement information fed back by the terminal device may be in the following form:

the first time of reporting: a transmit beam #1, a transmit beam #2, . . . ;

the second time of reporting: a transmit beam #3, a transmit beam #4, . . . .

Based on the group information fed back by the terminal device, the network device may determine that antenna panels, of the terminal device, corresponding to the transmit beam #1 and the transmit beam #2 are one antenna panel, and antenna panels, of the terminal device, corresponding to the transmit beam #3 and the transmit beam #4 are another antenna panel.

In an embodiment, the terminal device may alternatively report beams received on different antenna panels in one time of reporting. The beam measurement information fed back by the terminal device may be in the following form:

the first time of reporting: a transmit beam #1, a transmit beam #3, . . . ;

the second time of reporting: a transmit beam #2, a transmit beam #4, . . . .

Based on the group information fed back by the terminal device, the network device may determine that antenna panels, of the terminal device, corresponding to the transmit beam #1 and the transmit beam #3 are different, and antenna panels, of the terminal device, corresponding to the transmit beam #2 and the transmit beam #4 are different.

In an embodiment, a specific grouping method used by the terminal device may be predefined by a protocol, or may be indicated by the network device; or the terminal device autonomously determines the grouping method and notifies a grouping principle to the network device.

In an embodiment, before the receiving, by a terminal device by using a first receive parameter, control information sent by a network device, the method further includes:

sending, by the terminal device, beam switching capability information to the network device, where the beam switching capability information is used to indicate a first switching time required for switching between any two beams on a same antenna panel of the terminal device and a second switching time required for switching between any two beams on different antenna panels of the terminal device, or the beam information is used to indicate a first switching time required for switching between any two beams on a same antenna panel of the terminal device and a third switching time required for switching between any two antenna panels of the terminal device.

In other words, a time required by the terminal to switch from a beam on an antenna panel to another beam on the antenna panel is the first switching time, for example, 2 ms. A time required by the terminal to switch from a beam on an antenna panel to a beam on another antenna panel is the second switching time, for example, 10 ms. A time required by the terminal to switch from an antenna panel to another antenna panel is the third switching time, for example, 8 ms. A time required by the terminal to switch from a beam on an antenna panel to another beam on another antenna panel is at least 2 ms+8 ms. In other words, the second switching time is greater than or equal to a sum of the third switching time and the first switching time.

It should be understood that the first switching time includes the time required by the terminal to decode the control information and a time required by the terminal to perform beam switching on a same antenna panel, and the second switching time includes the time required by the terminal to decode the control information and a time required by the terminal to perform beam switching between different antenna panels.

It should be noted that, based on different capabilities of the terminal device, a time required by the terminal device to switch between any two beams on an antenna panel may be different from a time required by the terminal device to switch between any two beams on another antenna panel, or a time required by the terminal device to switch from a beam on an antenna panel (for example, a first antenna panel) to a beam on another antenna panel (for example, a second antenna panel) may be different from a time required by the terminal device to switch from a beam on the first antenna panel to a beam on a third antenna panel. In this case, the terminal device needs to indicate these switching cases and corresponding switching times in the beam switching capability information reported by the terminal device. For example, a time required for switching from the first antenna panel to the second antenna panel, a time required for switching from the second antenna panel to the first antenna panel, and a time required for switching from the first antenna panel to the third antenna panel are different, and therefore, the reported beam switching capability information may include the time required for switching from the first antenna panel to the second antenna panel, the time required for switching from the second antenna panel to the first antenna panel, and the time required for switching from the first antenna panel to the third antenna panel. It should be understood that the "first", "second", and "third" may also be extended to a first type, a second type, and a third type. For example, a first type of antenna panel is driven by one radio frequency link, and a second type of antenna panel is driven by two radio frequency links. In an embodiment, the determining, by the terminal device based on an antenna panel to which the first receive parameter belongs and an antenna panel to which the second receive parameter belongs, a beam switching time required for switching from the first receive parameter to the second receive parameter includes:

when the first receive parameter and the second receive parameter belong to a same antenna panel, determining, by the terminal device, that the beam switching time is the first switching time; or when the first receive parameter and the second receive parameter belong to different antenna panels, determining, by the terminal device, that the beam switching time is the second switching time, or determining, by the terminal device, that the beam switching time is greater than or equal to the sum of the first switching time and the third switching time.

For example, the network device may learn, based on the beam switching capability information fed back by the terminal device, a time required by the terminal device to switch from the first receive beam to the second receive beam, and the network device can efficiently schedule the terminal device.

In addition, the network device may autonomously determine the beam switching time required by the terminal device to switch from the first receive parameter to the second receive parameter. For example, a system may set that the terminal device can access a network only when the following conditions are met: A time required for switching between any two beams on a same antenna panel is the first switching time and a time required for switching between any two beams on different antenna panels is the second switching time, or a time required for switching between any two beams on a same antenna panel is the first switching time and a time required for switching between any two antenna panels is the third switching time. In this way, provided that the terminal device can access the network, the network device may determine, based on whether the first receive beam and the second receive beam belong to a same antenna panel of the terminal device, the beam switching time required by the terminal device to switch from the first receive parameter to the second receive parameter.

In an embodiment, the control information is further used to indicate a position of the to-be-transmitted signal in time domain; and the receiving, by the terminal device, the to-be-transmitted signal based on the beam switching time includes one or more of the following:

when the first receive parameter and the second receive parameter belong to a same antenna panel, if a time interval between the position of the to-be-transmitted signal in time domain and a position of the control information in time domain is greater than or equal to the first switching time, receiving, by the terminal device by using the second receive parameter, the to-be-transmitted signal at the position of the to-be-transmitted signal in time domain;

when the first receive parameter and the second receive parameter belong to a same antenna panel, if a time interval between the position of the to-be-transmitted signal in time domain and a position of the control information in time domain is less than the first switching time, receiving, by the terminal device by using a preset receive parameter, the to-be-transmitted signal at the position of the to-be-transmitted signal in time domain;

when the first receive parameter and the second receive parameter belong to different antenna panels, if a time interval between the position of the to-be-transmitted signal in time domain and a position of the control information in time domain is greater than or equal to the second switching time or is greater than or equal to the sum of the first switching time and the third switching time, receiving, by the terminal device by using the second receive parameter, the to-be-transmitted signal at the position of the to-be-transmitted signal in time domain; or when the first receive parameter and the second receive parameter belong to different antenna panels, if a time interval between the position of the to-be-transmitted signal in time domain and a position of the control information in time domain is less than the second switching time or is less than the sum of the first switching time and the third switching time, receiving, by the terminal device by using a preset receive parameter, the to-be-transmitted signal at the position of the to-be-transmitted signal in time domain.

It should be understood that the preset receiving parameter may be a beam used to receive the control information, that is, the first receive beam.

In this embodiment of this application, before the control information is decoded, the terminal device cannot determine a receive beam that is for receiving the to-be-transmitted signal and that is indicated by the network device, and cannot determine a length of the time interval between the position of the control information in time domain and the position of the to-be-transmitted signal in time domain. In this case, the terminal device may buffer a received signal by using the preset receive beam after receiving the control information and before the control information is decoded. If the terminal device determines that the time interval between the position of the control information in time domain and the position of the to-be-transmitted signal in time domain is greater than or equal to the beam switching time, the terminal device may clear a buffer, and receive the to-be-transmitted signal at the position of the to-be-transmitted signal in time domain.

In addition, in an embodiment of this application, if there is urgent data, for example, low-latency data, needing to be transmitted, the network device may transmit, by using a preset transmit beam, the to-be-transmitted signal before the beam switching time (for example, 2 ms) arrives, for example, transmit the to-be-transmitted signal in the first 1 ms. In this case, the network device and the terminal device need to define a preset receive beam and/or a corresponding preset transmit beam.

In an embodiment, the preset receive beam may be a receive beam corresponding to a control resource set with a lowest CORESET ID, or a receive beam corresponding to a control resource set that is with a lowest CORESET ID and that is corresponding to a current antenna panel of the terminal device.

The current antenna panel of the terminal device is an antenna panel corresponding to the first receive beam. For example, the antenna panel corresponding to the first receive beam is an antenna panel #1, and receive beams and antenna panels corresponding to control resource sets are separately: {first control resource set, antenna panel #2, receive beam #x}; {second control resource set, antenna panel #1, receive beam #y}; {third control resource set, antenna panel #1, receive beam #z}. In this case, the preset beam is the beam #y corresponding to the second control resource set, instead of the receive beam #x corresponding to the first control resource set.

In an embodiment, the preset receive beam may alternatively be a receive beam, used for random access, corresponding to the current antenna panel of the terminal device. In other words, if a receive beam #A on the current antenna panel of the terminal device is used in a previous random access process, the receive beam #A is used as the preset receive beam.

In an embodiment, the preset receive beam may alternatively be a receive beam, used for a latest time of successful transmission, corresponding to the current antenna panel of the terminal device.

In an embodiment, the control information is downlink control information DCI, and the to-be-transmitted signal is physical downlink shared channel PDSCH.

It should be understood that the to-be-transmitted signal may be a channel state information reference signal (CSI-RS) or another signal. This is not limited in this embodiment of this application.

According to a second aspect, a communication method is provided. The method includes:

determining, by a network device based on an antenna panel to which a first receive parameter belongs and an antenna panel to which a second receive parameter belongs, a beam switching time required by a terminal device to switch from the first receive parameter to the second receive parameter, where the first receive parameter is used by the terminal device to receive control information, and the second receive parameter is used by the terminal device to receive a to-be-transmitted signal;

determining, by the network device, a position of the to-be-transmitted signal in time domain based on the beam switching time;

sending, by the network device, the control information to the terminal device, where the control information is used to indicate the second receive parameter and the position of the to-be-transmitted signal in time domain; and sending, by the network device, the to-be-transmitted signal to the terminal device based on the position of the to-be-transmitted signal in time domain.

According to the communication method provided in this application, the network device determines, based on whether an antenna panel to which a receive beam of the control information belongs and an antenna panel to which a receive beam of the to-be-transmitted signal belongs are a same antenna panel, a beam switching time required by the terminal device to switch from the receive beam of the control information to the receive beam of the to-be-transmitted signal (where the beam switching time includes a time required by the terminal device to decode the control information), and properly sets, based on the beam switching time, a time interval between a position of the control information in time domain and the position of the to-be-transmitted signal in time domain, to properly schedule the terminal device. The terminal device does not consider, based on the prior art, that a beam switching time required for switching between any two receive beams of the terminal device is the same, and receives the to-be-transmitted signal based on the beam switching time. Instead, the terminal device needs to determine the beam switching time based on whether the two receive beams belong to a same antenna panel. Because a beam switching time required for switching between any two beams on a same antenna panel is different from a beam switching time required for switching between any two beams on different antenna panels, compared with the prior art, the terminal device can properly receive the to-be-transmitted signal based on a beam switching time.

In an embodiment, before the determining, by a network device based on an antenna panel to which a first receive parameter belongs and an antenna panel to which a second receive parameter belongs, a beam switching time required by a terminal device to switch from the first receive parameter to the second receive parameter, the method further includes:

sending, by the network device, reference signals by using one or more reference signal resources; and receiving, by the network device, beam measurement information sent by the terminal device, where the beam measurement information is used to indicate one or more target reference signal resources and one or more antenna panels that is of the terminal device and that separately corresponds to the one or more target reference signal resources, the one or more target reference signal resources are a part or all of the one or more reference signal resources, the one or more target reference signal resources correspond to a plurality of receive parameters, and the plurality of receive parameters include the first receive parameter and the second receive parameter.

In an embodiment, before the determining, by a network device based on an antenna panel to which a first receive parameter belongs and an antenna panel to which a second receive parameter belongs, a beam switching time required by a terminal device to switch from the first receive parameter to the second receive parameter, the method further includes:

receiving, by the network device, beam switching capability information sent by the terminal device, where the beam switching capability information is used to indicate a first switching time required for switching between any two beams on a same antenna panel of the terminal device and a second switching time required for switching between any two beams on different antenna panels of the terminal device, or the beam information is used to indicate a first switching time required for switching between any two beams on a same antenna panel of the terminal device and a third switching time required for switching between any two antenna panels of the terminal device.

In an embodiment, the determining, by a network device based on an antenna panel to which a first receive parameter belongs and an antenna panel to which a second receive parameter belongs, a beam switching time required by a terminal device to switch from the first receive parameter to the second receive parameter includes:

when the first receive parameter and the second receive parameter belong to a same antenna panel, determining, by the network device, that the beam switching time is the first switching time; or when the first receive parameter and the second receive parameter belong to different antenna panels, determining, by the network device, that the beam switching time is the second switching time, or determining, by the network device, that the beam switching time is greater than or equal to a sum of the first switching time and the third switching time.

In an embodiment, the determining, by the network device, a position of the to-be-transmitted signal in time domain based on the beam switching time includes:

when the first receive parameter and the second receive parameter belong to a same antenna panel, determining, by the network device, that a time interval between the position of the first transmission signal in time domain and a position of the control information in time domain is greater than or equal to the first switching time; and/or when the first receive parameter and the second receive parameter belong to different antenna panels, determining, by the network device, that a time interval between the position of the first transmission signal in time domain and a position of the control information in time domain is greater than or equal to the second switching time, or is greater than or equal to the sum of the first switching time and the third switching time.

In an embodiment, the control information is downlink control information DCI, and the to-be-transmitted signal is physical downlink shared channel PDSCH.

It should be understood that, in the second aspect, for some same or corresponding embodiments of the first aspect, refer to the descriptions in the first aspect. Details are not described herein again.

According to a third aspect, a communications apparatus is provided. The communications apparatus includes a unit configured to perform the method according to any one of the first aspect or the embodiments of the first aspect. The unit included in the communications apparatus may be implemented by software and/or hardware.

According to a fourth aspect, a communications apparatus is provided. The communications apparatus includes a unit configured to perform the method according to any one of the second aspect or the embodiments of the second aspect. The unit included in the communications apparatus may be implemented by software and/or hardware.

According to a fifth aspect, this application provides a communications device. The communications device includes at least one processor and a communications interface. The communications interface is used by the communications device to exchange information with another communications device; and when a program instruction is executed in the at least one processor, the method according to any one of the first aspect or the embodiments of the first aspect is implemented.

In an embodiment, the communications device may further include a memory. The memory is configured to store a program and data.

In an embodiment, the communications device may be a terminal device.

According to a sixth aspect, this application provides a communications device. The communications device includes at least one processor and a communications interface. The communications interface is used by the communications device to exchange information with another communications device; and when a program instruction is executed in the at least one processor, the method according to any one of the second aspect or the embodiments of the second aspect is implemented.

In an embodiment, the communications device may further include a memory. The memory is configured to store a program and data.

In an embodiment, the communications device may be a network device.

According to a seventh aspect, this application provides a computer-readable storage medium. The computer-readable storage medium stores program code for being executed by a communications device. The program code includes an instruction used to perform the method according to any one of the foregoing aspects or the embodiments of the foregoing aspects.

For example, the computer-readable storage medium may store program code for being executed by a terminal device, where the program code includes an instruction used to perform the method according to any one of the first aspect or the embodiments of the first aspect.

For example, the computer-readable storage medium may store program code for being executed by a network device, where the program code includes an instruction used to perform the method according to any one of the second aspect or the embodiments of the second aspect.

According to an eighth aspect, this application provides a computer program product including an instruction. When the computer program product is run on a communications device, the communications device is enabled to execute an instruction in the method according to any one of the foregoing aspects or the embodiments of the foregoing aspects.

For example, when the computer program product is executed on a terminal device, the terminal device is enabled to execute an instruction in the method according to any one of the first aspect or the embodiments of the first aspect.

For example, when the computer program product is executed on a network device, the network device is enabled to execute an instruction in the method according to any one of the second aspect or the embodiments of the second aspect.

According to a ninth aspect, this application provides a system chip. The system chip includes an input/output interface and at least one processor, and the at least one processor is configured to invoke an instruction in a memory, to perform an operation in the method according to any one of the foregoing aspects or the embodiments of the foregoing aspects.

In an embodiment, the system chip may further include at least one memory and a bus, and the at least one memory is configured to store the instruction executed by the processor.

DETAILED DESCRIPTION OF EMBODIMENTS

Figure 1:
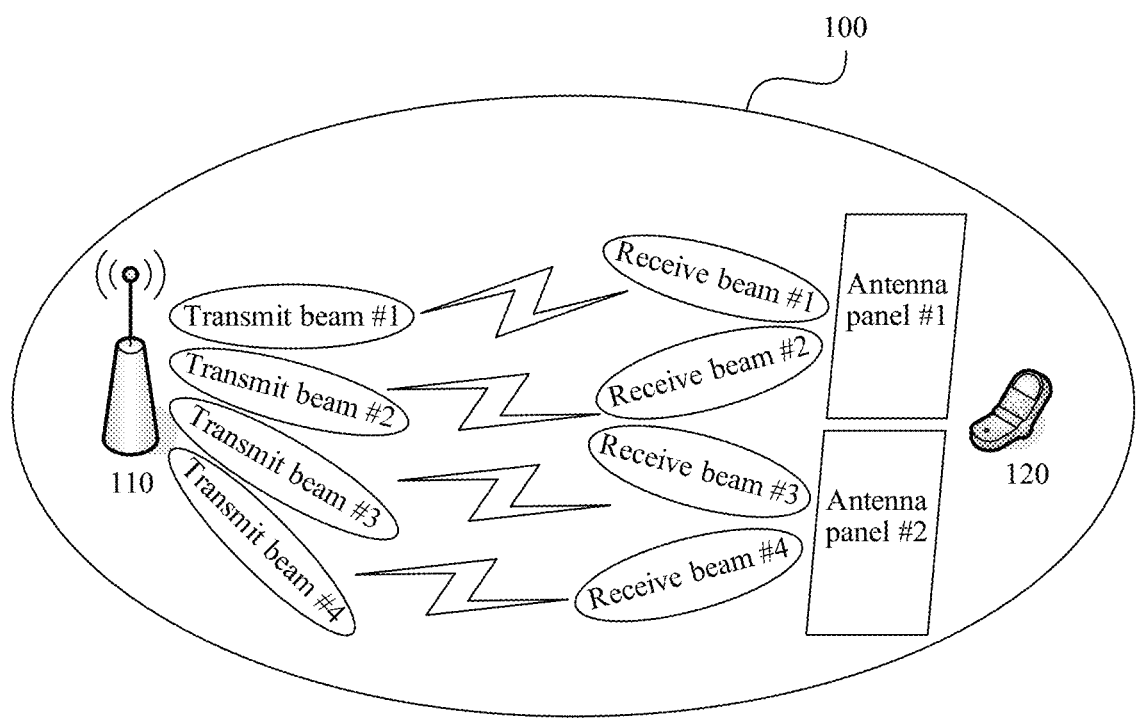
FIG. 1 is a schematic diagram of a communications system according to an embodiment.

The following describes technical solutions of this application with reference to the accompanying drawings.

The technical solutions of embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with a terminal. The network device may be a base transceiver station (BTS) in a GSM or a CDMA system, or may be a NodeB (NB) in a WCDMA system, or may be an evolved NodeB (eNB or eNodeB) in an LTE system, or may be a radio controller in a scenario of a cloud radio access network (CRAN). Alternatively, the network device may be a relay station, an access point, a vehicle-mounted device, a wearable device, a network device in a 5G network, a network device in a future evolved PLMN network, or the like. This is not limited in the embodiments of this application.

For ease of understanding of the embodiments of this application, some concepts or terms used in this application are first briefly described.

1. Beam

The beam is a communication resource. The beam may be a wide beam, a narrow beam, or a beam of another type. A technology for forming the beam may be a beamforming technology or another technical means. The beamforming technology may be a digital beamforming technology, an analog beamforming technology, or a hybrid digital/analog beamforming technology. Different beams may be considered as different resources. Same information or different information may be sent by using different beams. In an embodiment, a plurality of beams having a same or similar communication feature may be considered as one beam. One beam may include one or more antenna ports, configured to transmit a data channel, a control channel, a sounding signal, and the like.

A beam may alternatively be understood as a spatial resource, and may be a transmit or receive precoding vector having an energy transmission direction. The energy transmission direction may indicate that a signal, received in a spatial position, on which precoding processing is performed by using the precoding vector has a relatively good receive power, for example, meets a received demodulation signal to noise ratio. The energy transmission direction may also indicate that same signals sent from different spatial positions and received by using the precoding vector have different receive powers. A same device (for example, a network device or a terminal device) may have different precoding vectors, and different devices may also have different precoding vectors, to be specific, the different precoding vectors correspond to different beams. For a configuration or a capability of a device, one device may use one or more of a plurality of different precoding vectors at a same moment, in other words, one or more beams may be formed at the same time. From perspectives of transmitting and receiving, beams can be classified into a transmit beam and a receive beam.

The transmit beam is a directional beam transmitted by a multi-antenna by using the beamforming technology.

The receive beam is also directional in a direction of receiving a signal, and is directed to a direction of arrival of a transmit beam as much as possible, to further improve a received signal to noise indicator and avoid interference between users.

Information used to indicate a beam, for example, may be referred to as beam indication information. The beam indication information may be one or more of the following: a beam number (or a number, an index, an identifier (ID), or the like), an uplink signal resource number, a downlink signal resource number, an absolute index of the beam, a relative index of the beam, a logic index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of a transmit weight corresponding to the beam, an index of a weight matrix corresponding to the beam, an index of a weight vector corresponding to the beam, an index of a receive weight corresponding to the beam, a receive codebook corresponding to the beam, a transmit codebook corresponding to the beam, an index of a receive codebook corresponding to the beam, or an index of a transmit codebook corresponding to the beam. The downlink signal may be one or more of the following: a synchronization signal, a broadcast channel, a broadcast signal demodulation signal, a synchronization signal/PBCH block (SSB), a channel state information reference signal (CSI-RS), a cell-specific reference signal (CS-RS), a UE-specific reference signal (US-RS), a downlink control channel demodulation reference signal (DMRS), a downlink data channel demodulation reference signal, or a downlink phase tracking reference signal. An uplink signal may be one or more of the following: an uplink random access sequence, an uplink sounding reference signal (SRS), an uplink control channel demodulation reference signal, an uplink data channel demodulation reference signal, or an uplink phase tracking reference signal. In an embodiment, the network device may further allocate a QCL identifier to a beam that is in beams associated with a frequency resource group and that has a QCL relationship. The beam may also be referred to as a spatial domain transmission filter, the transmit beam may also be referred to as a spatial domain transmit filter, and the receive beam may also be referred to as a spatial domain receive filter.

The beam indication information may alternatively be represented as a transmission configuration indicator (Transmission Configuration Indicator, TCI) or a TCI state. For example, a structure of the TCI is as follows:

```
TCI-State ::=           SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServCellIndex
    bwp-Id                  BWP-Id
    referenceSignal         CHOICE {
        csi-rs                  NZP-CSI-RS-ResourceId,
        ssb                     SSB-Index,
        csi-RS-for-tracking     NZP-CSI-RS-ResourceSetId
    },
    qcl-Type                ENUMERATED {typeA, typeB, typeC, typeD},
    ...
}
```

The TCI may include a plurality of parameters, for example, a cell number, a bandwidth part number, a reference signal identifier, a synchronization signal block identifier, a quasi-colocation (QCL) type, or the like.

2. Beamforming Technology

By using the beamforming technology, a higher antenna array gain may be implemented by sending or receiving a signal in a specific direction in space.

Analog beamforming may be implemented by using a phase shifter. A radio frequency (RF) link adjusts a phase by using a phase shifter, to control a change in a direction of an analog beam. Therefore, one radio frequency link can generate only one analog beam at a same moment.

For communication that is based on analog beams, a beam at a transmit end and a beam at a receive end need to be aligned. Otherwise, a signal cannot be normally transmitted.

Signals in wireless communication need to be received and sent through antennas, and a plurality of antenna elements may be integrated on one panel. One radio frequency link may drive one or more antenna elements.

In the embodiments described herein, a terminal device may include a plurality of antenna panels, and each antenna panel includes one or more beams. A network device may also include a plurality of antenna panels, and each antenna panel includes one or more beams.

The antenna panel may alternatively be represented as an antenna array or an antenna subarray. One antenna panel may include one or more antenna arrays/subarrays. One antenna panel may be controlled by one or more oscillators.

The radio frequency link may also be referred to as a receive channel and/or a transmit channel, a receiver branch, or the like.

One antenna panel may be driven by one radio frequency link, or may be driven by a plurality of radio frequency links. Therefore, an antenna panel in this application may alternatively be replaced with a radio frequency link, or a plurality of radio frequency links that drive one antenna panel, or one or more radio frequency links that are controlled by one oscillator.

3. Control Resource Set (CORESET)

To improve efficiency of blindly detecting a control channel by a terminal device, a concept of a CORESET is proposed in an NR standard formulation process. A network device may configure one or more CORESETs for the terminal, to send PDCCHs. The network device may send a control channel to the terminal device on any CORESET corresponding to the terminal device. In addition, the network device further needs to notify the terminal device of another configuration associated with the CORESET, for example, a search space. Configuration information of each CORESET has some differences, for example, a frequency domain width difference and a time domain length difference. That the terminal device blindly detects the control channel is actually blindly detecting the control channel by blindly detecting a search space. One CORESET may be associated with one or more search spaces. Therefore, one CORESET in this application may alternatively be replaced with one or more search spaces.

The following describes in detail a communication method in the embodiments of this application.

To make a person skilled in the art better understand this application, a communications system applicable to this application is first described.

FIG. 1 is a schematic diagram of a communications system according to an embodiment. As shown in FIG. 1, communications system 100 includes at least one network device 110 and at least one terminal device 120. Through a beam training process, the network device 110 may obtain a plurality of beam pairs that have better communication with the terminal device 120. The beam training process includes the following steps.

Step 1: The network device sends a reference signal by using one or more (that is, at least one) reference signal resources. Correspondingly, the terminal device receives the reference signals sent by the network device by using the one or more reference signal resources.

It should be understood that the reference signal resource may be a CSI-RS resource. However, this is not limited in this embodiment of this application. The reference signal resource may be represented by using an index (or a number, or an identifier (ID)) of the reference signal resource. The reference signal resource may be understood as a transmit beam of the network device. Different reference signal resources may correspond to different transmit beams, and different reference signal resources may alternatively correspond to a same transmit beam. That the network device sends the reference signals by using a plurality of reference signal resources may be understood as that the network device sends the reference signals to the terminal device by using a plurality of transmit beams. The reference signal may be a CSI-RS, a synchronization signal block, or the like. This is not limited in this embodiment of this application. To make a person skilled in the art better understand this application, in the following method embodiment, a "transmit beam" is used to replace a "reference signal resource", to describe the embodiments of this application.

Step 2: The terminal device determines, based on measurement of the reference signals, one or more target transmit beams and one or more antenna panels that is of the terminal device and that separately corresponds to the one or more target transmit beams. The one or more target transmit beams are a part or all of the one or more transmit beams.

For example, the terminal device may determine and obtain one or more better transmit beams (namely, one or more target transmit beams) of the network device by measuring the reference signals on the one or more transmit beams of the network device. For example, the terminal device may select one or more transmit beams with relatively large RSRPs of the transmit beams as the one or more better transmit beams. In addition, the terminal device measures a same transmit beam of the network device by using different receive beams, to obtain a plurality of better receive beams. Therefore, a plurality of beam pairs (one beam pair includes one transmit beam of the network device and one receive beam of the terminal device) with better communication can be obtained.

Herein, transmit beams of the network devices that are included in different beam pairs in the plurality of beam pairs may be the same or may be different, and receive beams of the terminal device that are included in different beam pairs in the plurality of beam pairs may be the same or may be different. In other words, one transmit beam may correspond to a plurality of receive beams, or a plurality of transmit beams may correspond to one receive beam, or transmit beams and receive beams have a one-to-one correspondence. For example, the plurality of beam pairs may include <transmit beam #1, receive beam #1> and <transmit beam #1, receive beam #2>, or the plurality of beam pairs may include <transmit beam #1, receive beam #1> and <transmit beam #2, receive beam #1>, or the plurality of beam pairs may include <transmit beam #1, receive beam #1> and <transmit beam #2, receive beam #2>.

To make a person skilled in the art better understand this application, that the plurality of beam pairs include <transmit beam #1, receive beam #1>, <transmit beam #2, receive beam #2>, <transmit beam #3, receive beam #3>, <transmit beam #4, receive beam #4> is used as an example for description in the following.

The receive beams of the terminal device in the plurality of beam pairs may belong to different antenna panels. For example, referring to FIG. 1, the receive beam #1 and the receive beam #2 belong to an antenna panel #1 of the terminal device, and the receive beam #1 and the receive beam #2 belong to an antenna panel #2 of the terminal device.

In this embodiment, the terminal device may maintain a correspondence among a transmit beam of the network device, a receive beam of the terminal device, and an antenna panel of the terminal device. For example, a correspondence, maintained by the terminal device, among a transmit beam of the network device, a receive beam of the terminal device, and an antenna panel of the terminal device is shown in Table 1.

TABLE 1

| Antenna panel | Receive beam | Transmit beam |
| --- | --- | --- |
| Antenna panel #1 | Receive beam #1 | Transmit beam #1 |
| Antenna panel #1 | Receive beam #2 | Transmit beam #2 |
| Antenna panel #2 | Receive beam #3 | Transmit beam #3 |
| Antenna panel #2 | Receive beam #4 | Transmit beam #4 |

Step 3: The terminal device sends beam measurement information to the network device. The beam measurement information is used to indicate the one or more target transmit beams and the one or more antenna panels that is of the terminal device and that separately corresponds to the one or more target transmit beams. Correspondingly, the network device receives the beam measurement information sent by the terminal device.

For example, after obtaining the plurality of better transmit beams of the network device, the terminal device may feed back beam measurement information of the plurality of better transmit beams to the network device. The beam measurement information is used to indicate the transmit beam and an antenna panel, of the terminal device, corresponding to the transmit beam. The beam measurement information may include an index of the transmit beam and an index of the antenna panel, of the terminal device, corresponding to the transmit beam. Further, the beam measurement information may include an index of a receive beam, of the terminal device, corresponding to the transmit beam. It should be understood that the antenna panel, of the terminal device, corresponding to the transmit beam is an antenna panel to which the receive beam corresponding to the transmit beam belongs. For example, referring to FIG. 1, an antenna panel corresponding to the transmit beam #1 is the antenna panel #1 in which the receive beam #1 is located. In addition, the beam measurement information may alternatively include an RSRP of the transmit beam. However, this is not limited in this embodiment of this application.

In an embodiment, after determining the plurality of beam pairs described above, the terminal device may explicitly feed back indexes of the plurality of transmit beams and indexes of corresponding antenna panels of the terminal device. For example, the beam measurement information fed back by the terminal device may be in the following form:

{transmit beam #1, antenna panel #1, . . . }; {transmit beam #2, antenna panel #2, . . . }; {transmit beam #3, antenna panel #3, . . . }; and {transmit beam #4, antenna panel #4, . . . }.

It should be understood that the ellipsis herein indicates that the terminal device may further feed back other information in addition to the index of the transmit beam and the index of the antenna panel, for example, beam quality of the transmit beam, including an RSRP, a received signal strength indicator (RSSI), reference signal received quality (RSRQ), a signal to interference plus noise ratio (SINR), a channel quality indicator (CQI), a rank indicator (RI), a precoding matrix indicator (PMI), or the like.

In another embodiment, after determining the plurality of beam pairs described above, the terminal device may feed back the antenna panel, of the terminal device, corresponding to the transmit beam by feeding back group information of the transmit beam. For example, the terminal device may classify beams received on a same antenna panel into one group. The beam measurement information fed back by the terminal device may be in the following form:

{group #1, transmit beam #1, transmit beam #2, . . . }; and {group #2, transmit beam #3, transmit beam #4, . . . }.

Based on the group information fed back by the terminal device, the network device may determine that antenna panels, of the terminal device, corresponding to the transmit beam #1 and the transmit beam #2 are one antenna panel, and antenna panels, of the terminal device, corresponding to the transmit beam #3 and the transmit beam #4 are another antenna panel.

It should be understood that the ellipsis herein indicates that the terminal device may further feed back other information in addition to the index of the transmit beam and the index of the antenna panel, for example, beam quality of the transmit beam, including an RSRP, RSRQ, an RSSI, an SINR, a CQI, an RI, a PMI, or the like.

In an embodiment, the terminal device may alternatively classify beams received on different antenna panels into one group. The beam measurement information fed back by the terminal device may be in the following form:

{group #1, transmit beam #1, transmit beam #3, . . . }; and {group #2, transmit beam #2, transmit beam #4, . . . }.

Based on the group information fed back by the terminal device, the network device may determine that antenna panels, of the terminal device, corresponding to the transmit beam #1 and the transmit beam #3 are different, and antenna panels, of the terminal device, corresponding to the transmit beam #2 and the transmit beam #4 are different.

In an embodiment, the terminal device may alternatively report beams received on a same antenna panel in one time of reporting. The terminal device reports beams received on different antenna panels in different times of reporting. The beam measurement information fed back by the terminal device may be in the following form:

the first time of reporting: a transmit beam #1, a transmit beam #2, . . . ;
the second time of reporting: a transmit beam #3, a transmit beam #4, . . . .

Based on the group information fed back by the terminal device, the network device may determine that antenna panels, of the terminal device, corresponding to the transmit beam #1 and the transmit beam #2 are one antenna panel, and antenna panels, of the terminal device, corresponding to the transmit beam #3 and the transmit beam #4 are another antenna panel.

In an embodiment, the terminal device may alternatively report beams received on different antenna panels in one time of reporting. The beam measurement information fed back by the terminal device may be in the following form:

the first time of reporting: a transmit beam #1, a transmit beam #3, . . . ;
the second time of reporting: a transmit beam #2, a transmit beam #4, . . . .

Based on the group information fed back by the terminal device, the network device may determine that antenna panels, of the terminal device, corresponding to the transmit beam #1 and the transmit beam #3 are different, and antenna panels, of the terminal device, corresponding to the transmit beam #2 and the transmit beam #4 are different.

In an embodiment, a specific grouping method used by the terminal device may be predefined by a protocol, or may be indicated by the network device; or the terminal device autonomously determines the grouping method and notifies a grouping principle to the network device.

It should be understood that the communications system 100 may further include more network devices and terminal devices, which are not shown one by one herein. In addition, the terminal device may also include more antenna panels and beams, which are not shown one by one herein either. The network device may alternatively include a plurality of antenna panels. For example, the transmit beam #1 and the transmit beam #2 belong to one antenna panel, and the transmit beam #3 and the transmit beam #4 belong to another antenna panel.

Correspondingly, the network device may alternatively notify the terminal device of information about the antenna panel of the transmit beam. For example, the network device classifies beams on a same antenna panel into one group. A CSI-RS is used as an example. The network device may configure a plurality of CSI-RS resource sets, and CSI-RS resources in each CSI-RS resource set correspond to beams on a same antenna panel of the network device. Further, the network device may configure the terminal device, so that the terminal device provides a feedback for each CSI-RS resource set. For example, CSI-RS resources that can be simultaneously received on a same antenna panel of the terminal device and that are from different CSI-RS resource sets are classified into one group. In this way, the terminal device may learn of transmit beams that can be simultaneously sent by the network device, and the network device may learn of transmit beams that can simultaneously serve the terminal device.

In conclusion, according to step 1 to step 3, both the terminal device and the network device can obtain the plurality of beam pairs used for communication, and an antenna panel, of the terminal device, corresponding to each beam pair, that is, an antenna panel, of the terminal device, corresponding to a transmit beam or a receive beam in each beam pair.

The following describes a communication method in an embodiment of this application with reference to the system 100 shown in FIG. 1 and the descriptions of the beam training.

Figure 2:
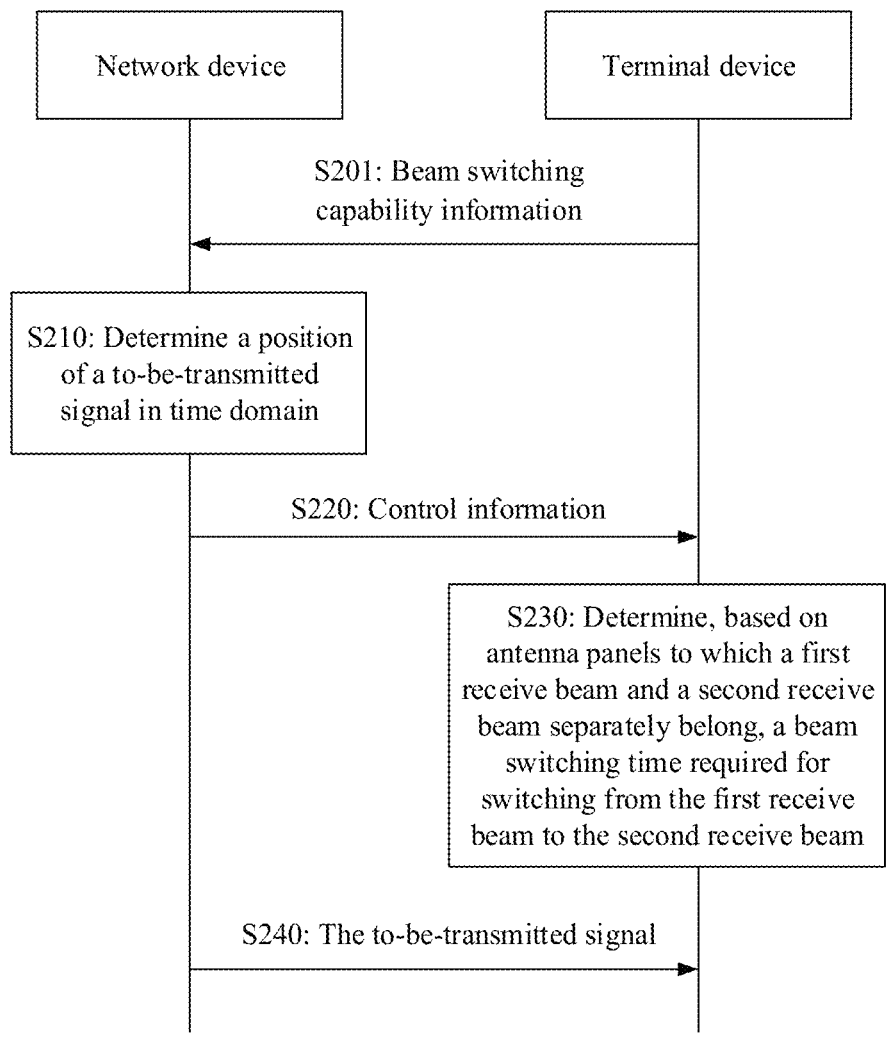
FIG. 2 is a schematic diagram of a communication method according to an embodiment.

FIG. 2 is a schematic flowchart of a communication method according to an embodiment. As shown in FIG. 2, method 200 includes S210 to S230. It should be understood that in the method 200 shown in FIG. 2, a network device may be the network device 110 in the system shown in FIG. 1, and a terminal device may be the terminal device 120 in the system shown in FIG. 1.

S210: The network device determines a position of a to-be-transmitted signal in time domain.

S220: The terminal device receives, by using a first receive parameter, control information sent by the network device. Correspondingly, the network device sends the control information to the terminal device. The control information is used to indicate a second receive parameter and the position of the to-be-transmitted signal in time domain, where the to-be-transmitted signal is scheduled by using the control information.

It should be understood that a "receive parameter" in this application may be understood as a "receive beam", and the receive beam is a receive beam of the terminal device. To make a person skilled in the art better understand this application, in the following method embodiment, a "receive beam" is used to replace a "receive parameter", to describe the embodiments of this application. It should be understood that the foregoing "receive beam" may also be replaced with a "receive parameter". The terminal device and the network device communicate with each other by using beams, and the terminal device may determine a corresponding receive beam based on a transmit beam of the network device. Therefore, during downlink scheduling transmission, the network device may indicate, to the terminal device, a receive beam of the terminal device by sending, to the terminal device, beam indication information of a transmit beam of the network device or beam indication information of the receive beam of the terminal device. Therefore, "A indicates a receive parameter" and "A indicates a transmit beam" are equivalent concepts. For example, that the control information is used to indicate the second receive parameter and that the control information is used to indicate a second transmit beam are equivalent concepts. Herein, the second receive parameter corresponds to the second transmit beam. When the network device performs sending by using the second transmit beam, the terminal device performs receiving by using the second receive parameter. The beam indication information may be an identifier, an index, or the like of a beam. For details, refer to the descriptions of the beam indication information in this specification. Details are not described herein again.

The following describes S210 to S220 in detail in two scenarios.

Scenario 1

The network device determines, based on an antenna panel to which the first receive parameter belongs and an antenna panel to which the second receive parameter belongs, a beam switching time required by the terminal device to switch from the first receive parameter to the second receive parameter, and determines the position of the to-be-transmitted signal in time domain based on the beam switching time required by the terminal device to switch from the first receive parameter to the second receive parameter.

For example, the to-be-transmitted signal is data of a common service, and the network device may determine, from transmit beams of the network device, a transmit beam (for example, denoted as a second transmit beam) for sending the to-be-transmitted signal. Before this, the network device further needs to determine a transmit beam (for example, denoted as a first transmit beam) for sending the control information. The first transmit beam and the second transmit beam may be a same beam or may be different beams. Because the network device and the terminal device communicate with each other by using a beam pair, that the network device determines the transmit beam may also be understood as that the network device determines a receive beam of the terminal device. When the network device determines the transmit beam, for example, the network device may select a transmit beam that is fed back by the terminal device and that has a relatively large RSRP. It should be understood that how the network device selects the transmit beam or how the network device selects the receive beam is not limited in this embodiment of this application.

Therefore, after or at the same time when the first transmit beam and the second transmit beam are determined or the first receive beam and the second receive beam are determined, the network device may determine antenna panels, of the terminal device, to which the first receive beam and the second receive beam separately belong, or determine whether the first receive beam and the second receive beam belong to a same antenna panel of the terminal device. The network device determines, based on the antenna panels to which the first receive beam and the second receive beam separately belong, the beam switching time t required by the terminal device to switch from the first receive parameter to the second receive parameter. After determining the beam switching time t, the network device may set a time interval of t between the position of the to-be-transmitted signal in time domain and a position of the control information in time domain to be greater than or equal to the beam switching time t. In this way, the terminal device can switch from the first receive beam to the second receive beam before or when the position of the to-be-transmitted signal in time domain arrives, and receive the to-be-transmitted signal by using the second receive beam. For example, if the switching time required by the terminal device to switch from the first receive parameter to the second receive parameter is 2 milliseconds (ms), the network device may set the time interval of t to 2 ms or any time greater than 2 ms.

In an embodiment, before S210, the network device and the terminal device may perform step 1 to step 3 described in the foregoing, and based on beam measurement information fed back by the terminal device, the network device can determine the antenna panels, of the terminal device, to which the first receive beam and the second receive beam separately belong, or can determine whether the first receive beam and the second receive beam belong to a same antenna panel of the terminal device. For example, referring to the foregoing Table 1, if the first transmit beam is the transmit beam #1, and the second transmit beam is the transmit beam #2, it may be determined that both an antenna panel, of the terminal device, corresponding to the first transmit beam and an antenna panel, of the terminal device, corresponding to the second transmit beam are the antenna panel #1. If the first transmit beam is the transmit beam #1, and the second transmit beam is the transmit beam #3, it may be determined that an antenna panel, of the terminal device, corresponding to the first transmit beam is the antenna panel #1, and an antenna panel, of the terminal device, corresponding to the second transmit beam is the antenna panel #2. Usually, a beam switching time required for switching between two beams belonging to different antenna panels is greater than a beam switching time required for switching between two beams belonging to a same antenna panel. However, another possibility is not excluded in this application.

In an embodiment, before S210, the method may further include the following.

S201: The terminal device sends beam switching capability information to the network device. Correspondingly, the network device receives the beam switching capability information sent by the terminal device.

The beam switching capability information is used to indicate a first switching time required for switching between any two beams on a same antenna panel of the terminal device and a second switching time required for switching between any two beams on different antenna panels of the terminal device. Alternatively, the beam information is used to indicate a first switching time required for switching between any two beams on a same antenna panel of the terminal device and a third switching time required for switching between any two antenna panels of the terminal device.

In other words, a time required by the terminal device to switch from a beam on an antenna panel to another beam on the antenna panel is the first switching time, for example, 2 ms. A time required by the terminal device to switch from a beam on an antenna panel to a beam on another antenna panel is the second switching time, for example, 10 ms. A time required by the terminal device to switch from an antenna panel to another antenna panel is the third switching time, for example, 8 ms. A time required by the terminal device to switch from a beam on an antenna panel to another beam on another antenna panel is at least 2 ms+8 ms. In other words, the second switching time is greater than or equal to a sum of the third switching time and the first switching time.

Therefore, after learning of the first switching time and/or the second switching time based on the beam switching capability information, or learning of the first switching time and the third switching time, the network device may determine that the beam switching time t is the first switching time when the first receive beam and the second receive beam belong to a same antenna panel. Alternatively, when the first receive beam and the second receive beam belong to different antenna panels, the network device determines that the beam switching time t is the second switching time, or is the sum of the first switching time and the third switching time.

It should be noted that, based on different capabilities of the terminal device, a time required by the terminal device to switch between any two beams on an antenna panel may be different from a time required by the terminal device to switch between any two beams on another antenna panel, or a time required by the terminal device to switch from a beam on an antenna panel (for example, a first antenna panel) to a beam on another antenna panel (for example, a second antenna panel) may be different from a time required by the terminal device to switch from a beam on the first antenna panel to a beam on a third antenna panel. In this case, the terminal device needs to indicate these switching cases and corresponding switching times in the beam switching capability information reported by the terminal device. For example, a time required for switching from the first antenna panel to the second antenna panel, a time required for switching from the second antenna panel to the first antenna panel, and a time required for switching from the first antenna panel to the third antenna panel are different, and therefore, the reported beam switching capability information may include the time required for switching from the first antenna panel to the second antenna panel, the time required for switching from the second antenna panel to the first antenna panel, and the time required for switching from the first antenna panel to the third antenna panel. It should be understood that the "first", "second", and "third" may also be extended to a first type, a second type, and a third type. For example, a first type of antenna panel is driven by one radio frequency link, and a second type of antenna panel is driven by two radio frequency links.

It should be understood that S201 may be performed after the terminal device accesses a network and establishes a connection to the network device. However, this is not limited in this embodiment of this application. Further, the terminal device may send the beam switching capability information through an uplink data channel.

In an embodiment, the network device may autonomously determine the beam switching time t. For example, a system may set that the terminal device can access the network only when the following conditions are met: A time required for switching between any two beams on a same antenna panel is the first switching time and a time required for switching between any two beams on different antenna panels is the second switching time, or a time required for switching between any two beams on a same antenna panel is the first switching time and a time required for switching between any two antenna panels is the third switching time. In this way, provided that the terminal device can access the network, the network device may determine the beam switching time t based on whether the first receive beam and the second receive beam belong to a same antenna panel of the terminal device.

It should be noted that, in this application, the switching from the first receive beam to the second receive beam refers to means that the terminal device receives the control information, obtains the second receive beam by decoding the control information, and switches to the second receive beam. In other words, the beam switching time t described in this application includes a time required by the terminal device to decode the control information and a time required by the terminal device to perform beam switching after the control information is decoded. The first switching time includes a time required by the terminal device to decode the control information and a time required by the terminal device to perform beam switching after the control information is decoded. The second switching time includes a time required by the terminal device to decode the control information and a time required by the terminal device to perform beam switching after the control information is decoded.

Scenario 2

The network device may not determine the position of the to-be-transmitted signal in time domain based on a beam switching time required by the terminal device.

For example, when the to-be-transmitted signal is data of an urgent service, the network device may also determine the first receive beam and the second receive beam described above. However, considering information such as a service latency requirement, the network device may not consider the beam switching time t, and set a time interval oft to be less than the beam switching time t.

Further, considering that a format of control information in an existing protocol is still used, the network device may indicate the second receive beam to the terminal by using the control information.

In an embodiment, after determining a first transmit beam, the network device may notify the terminal device of the first transmit beam by using RRC signaling and/or other signaling. In other words, the RRC signaling and/or other signaling are/is used to indicate the first transmit beam. Because the first transmit beam corresponds to the first receive beam, it may also be understood that the RRC signaling and/or other signaling are/is used to indicate the first receive beam. For example, the RRC signaling may carry a list, where the list may include a possible index of the first transmit beam corresponding to the first receive beam, or the list may include a possible index of the first receive beam; and one index may be selected from the list by using other signaling such as MAC-CE signaling. The terminal device may learn, based on the RRC signaling and/or other signaling, that the first receive beam needs to be used to receive the control information.

In an embodiment, the control information may carry an index of the second transmit beam corresponding to the second receive beam or carry an index of the second receive beam. For another example, the network device may indicate the second receive beam to the terminal in a bitmap manner. For example, transmit beams of the network device that are fed back by the terminal device are a transmit beam #1 to a transmit beam #4, and the second transmit beam is a transmit beam #2. In this case, the network device may indicate the transmit beam #2 by setting a bit corresponding to the transmit beam #2 to 0 or 1. For example, a bitmap sent by the network device is "0100" or "1011". The terminal device may learn, based on the control information, that the second receive beam needs to be used to receive the control information.

In an embodiment, the network device may explicitly or implicitly indicate, to the terminal device, information about an antenna panel. For example, the information about an antenna panel may include information about a transmit antenna panel and/or information about a receive antenna panel. The information, indicated by the network device, about an antenna panel may be in one of the following forms:

A: {transmit antenna panel of the network device, transmit beam of the network device, receive antenna panel of the terminal device, receive beam of the terminal device};

B: {transmit beam of the network device, receive antenna panel of the terminal device, receive beam of the terminal device};

C: {transmit beam of the network device, receive beam of the terminal device};

D: {transmit antenna panel of the network device, transmit beam of the network device};

E: {transmit beam of the network device};

F: {receive antenna panel of the terminal device, receive beam of the terminal device}; or G: {receive antenna panel of the terminal device}.

S230: The terminal device determines, based on an antenna panel to which the first receive beam belongs and an antenna panel to which the second receive beam belongs, the beam switching time t required by the terminal device to switch from the first receive beam to the second receive beam.

In an embodiment, when the first receive beam and the second receive beam belong a same antenna panel, the terminal device may determine that the beam switching time t is a first switching time.

In an embodiment, when the first receive beam and the second receive beam belong to different antenna panels, the terminal device may determine that the beam switching time t is a second switching time, or determine that the beam switching time t is greater than or equal to a sum of a first switching time and a third switching time. The third switching time is a time required for switching between any two antenna panels of the terminal device.

S240: The network device sends the to-be-transmitted signal. Correspondingly, the terminal device receives the to-be-transmitted signal based on the determined beam switching time t.

For example, in the foregoing scenario 1, the network device may send, by using the second transmit beam, the to-be-transmitted signal at the position of the to-be-transmitted signal in time domain after the beam switching time t (for example, 2 ms) arrives. In the foregoing scenario 2, the network device may send, by using a preset transmit beam, the to-be-transmitted signal before the beam switching time t (for example, 2 ms) arrives, for example, send the to-be-transmitted signal in the first 1 ms. The terminal device may determine, based on a relationship between values of the beam switching time t and the time interval oft between the position of the to-be-transmitted signal in time domain and a position of the control information in time domain, a receive beam used by the terminal device to receive the to-be-transmitted signal, and receive the to-be-transmitted signal based on the determined receive beam.

With reference to a case 1 and a case 2, the following describes a receiving operation performed by the terminal device in S240.

In an embodiment, when the first receive beam and the second receive beam belong to a same antenna panel (that is, the case 1), the terminal device receives the to-be-transmitted signal based on a relationship between values of the time interval oft and the first switching time. When the first receive beam and the second receive beam belong to different antenna panels (that is, the case 2), the terminal device receives the to-be-transmitted signal based on a relationship between values of the time interval oft and the second switching time or a relationship between values of the time interval oft and the sum of the first switching time and the third switching time.

The following uses an example in which the control information is DCI, the to-be-transmitted signal is a PDSCH or a signal carried on a PDSCH, the first receive beam is a receive beam #1, and the second receive beam is separately a receive beam #2 or a receive beam #3. For different cases, this is described in detail with reference to FIG. 3 and FIG. 4. Herein, for a correspondence between a receive beam and an antenna panel, refer to Table 1 and FIG. 1. It should be understood that the to-be-transmitted signal may further be a CSI-RS or another signal. This is not limited in this embodiment.

Case 1

Figure 3:
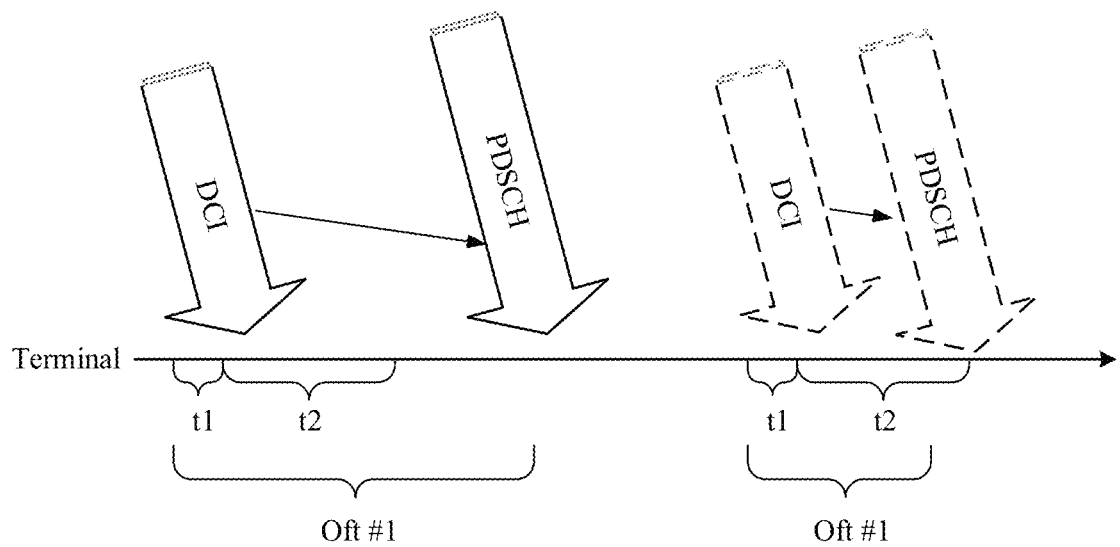
FIG. 3 is a schematic diagram of a specific embodiment of a communication method according to an embodiment.

Referring to FIG. 3, the terminal device may complete decoding of the DCI after a duration t1 after a time point at which the DCI is received by using the receive beam #1, to learn that the PDSCH needs to be received from the receive beam #2 and learn of a time interval oft #1 between a position of the DCI in time domain and a position of the PDSCH in time domain. Because the receive beam #1 and the receive beam #2 are located on a same antenna panel, the terminal device needs to compare the first switching time t1+t2 with oft #1. If oft #1≥t1+t2, the terminal device may receive the PDSCH at the position of the PDSCH in time domain by using the receive beam #2. If oft #1<t1+t2, the terminal device needs to receive the PDSCH by using a preset receive beam. Further, the preset receive beam may be a beam used to receive the DCI, that is, the receive beam #1 herein. It should be understood that t2 is a time required by the terminal device to switch from the receive beam #1 to the receive beam #2 after the DCI is decoded.

Case 2

Figure 4:
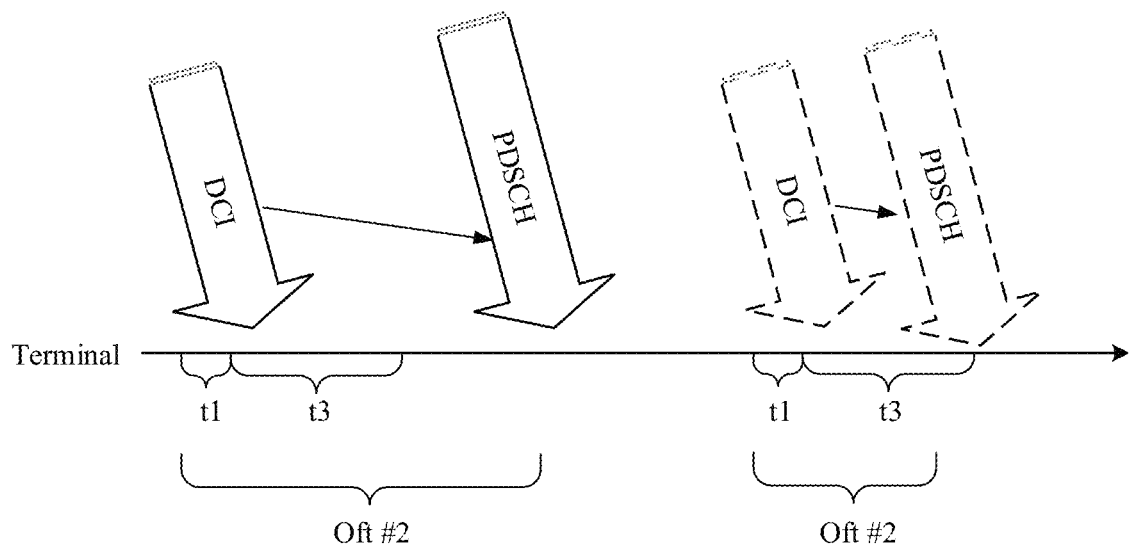
FIG. 4 is a schematic diagram of another specific embodiment of a communication method according to an embodiment.

Referring to FIG. 4, the terminal device may complete decoding of the DCI after a duration t1 after a time point at which the DCI is received by using the receive beam #1, to learn that the PDSCH needs to be received from the receive beam #3 and learn of a time interval oft #2 between a position of the DCI in time domain and a position of the PDSCH in time domain. Because the receive beam #1 and the receive beam #3 are located on different antenna panels, the terminal device needs to compare the second switching time t1+t3 with oft #2. If oft #2≥t1+t3, the terminal device may receive the PDSCH at the position of the PDSCH in time domain by using the receive beam #3. If oft #2<t1+t3, the terminal device needs to receive the PDSCH by using a preset receive beam. Further, the preset receive beam may be a beam used to receive the DCI, that is, the receive beam #1 herein. It should be understood that t3 is a time required by the terminal device to switch from the receive beam #1 to the receive beam #3 after the DCI is decoded.

It should be understood that the preset receive beam corresponds to a preset transmit beam, or the preset receive beam and the preset transmit beam are a beam pair.

It should be understood that after learning that the PDSCH needs to be received from the receive beam #3 and learning of the time interval oft #2 between the position of the DCI in time domain and the position of the PDSCH in time domain, the terminal device may also compare oft #2 with the sum of the first switching time and the third switching time.

In this embodiment of this application, before the DCI is decoded, the terminal device cannot determine a receive beam that is for receiving the PDSCH and that is indicated by the network device, and cannot determine a length of the time interval between the position of the DCI in time domain and the position of the PDSCH in time domain. In this case, the terminal device may buffer a received signal by using the preset receive beam in the time t1+t2 or the time t1+t3. Alternatively, the terminal device may buffer the received signal by using the preset receive beam in the time t1. If oft #1≥t1+t2 or oft #2≥t1+t3, the terminal device may clear a buffer and receive the PDSCH at the position of the PDSCH in time domain.

In addition, in an embodiment, the preset receive beam may be a receive beam corresponding to a control resource set with a lowest CORESET ID, or a receive beam corresponding to a control resource set that is with a lowest CORESET ID and that is corresponding to a current antenna panel of the terminal device.

The current antenna panel of the terminal device is an antenna panel corresponding to the first receive beam. For example, the antenna panel corresponding to the first receive beam is an antenna panel #1, and receive beams and antenna panels corresponding to control resource sets are separately: {first control resource set, antenna panel #2, receive beam #x}; {second control resource set, antenna panel #1, receive beam #y}; {third control resource set, antenna panel #1, receive beam #z}. In this case, the preset beam is the beam #y corresponding to the second control resource set, instead of the receive beam #x corresponding to the first control resource set.

In an embodiment, the preset receive beam may alternatively be a receive beam, used for random access, corresponding to the current antenna panel of the terminal device. In other words, if a receive beam #A on the current antenna panel of the terminal device is used in a previous random access process, the receive beam #A is used as the preset receive beam.

In an embodiment, the preset receive beam may alternatively be a receive beam, used for a latest time of successful transmission, corresponding to the current antenna panel of the terminal device.

Therefore, according to the method in the embodiments of this application, the terminal device does not consider that a beam switching time required for switching between any two receive beams of the terminal device is the same, and receives the to-be-transmitted signal based on the beam switching time. Instead, the terminal device needs to determine the beam switching time based on whether the two receive beams belong to a same antenna panel, and receives the to-be-transmitted signal based on the switching time. Because a beam switching time required for switching between any two beams on a same antenna panel is different from a beam switching time required for switching between any two beams on different antenna panels, compared with the prior art, the terminal device can receive the to-be-transmitted signal more accurately based on a beam switching time.

In addition, the network device determines, based on whether an antenna panel to which a receive beam of the control information belongs and an antenna panel to which a receive beam of the to-be-transmitted signal belongs are a same antenna panel, a beam switching time required by the terminal device to switch from the receive beam of the control information to the receive beam of the to-be-transmitted signal (where the beam switching time includes a time required by the terminal device to decode the control information), and properly sets, based on the beam switching time, a time interval between the position of the control information in time domain and the position of the to-be-transmitted signal in time domain, to properly schedule the terminal device.

The foregoing describes in detail examples of the communication method provided in this application. It may be understood that, to implement the foregoing functions, the terminal device and the network device each include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
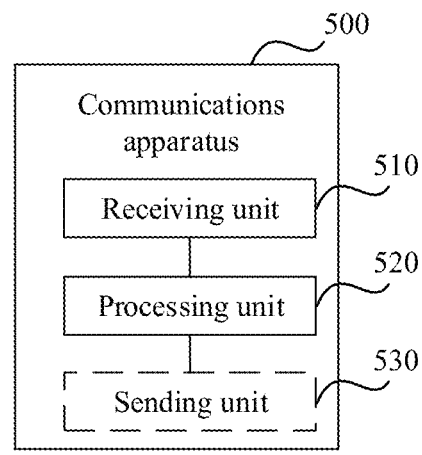
FIG. 5 is a schematic structural diagram of a communications apparatus according to an embodiment.

FIG. 5 is a schematic structural diagram of a communications apparatus according to an embodiment. The communications apparatus 500 includes a receiving unit 510 and a processing unit 520. In an embodiment, the communications apparatus 500 may further include a sending unit 530.

The receiving unit 510 is configured to receive, by using a first receive parameter, control information sent by a network device, where the control information is used to indicate a second receive parameter, and the second receive parameter is used by the communications apparatus to receive a to-be-transmitted signal.

The processing unit 520 is configured to determine, based on an antenna panel to which the first receive parameter belongs and an antenna panel to which the second receive parameter belongs, a beam switching time required for switching from the first receive parameter to the second receive parameter.

The receiving unit 510 is further configured to receive the to-be-transmitted signal based on the beam switching time.

In an embodiment, the receiving unit 510 is further configured to receive reference signals sent by the network device by using one or more reference signal resources.

The processing unit 520 is further configured to: determine, based on measurement of the reference signals, one or more target reference signal resources and a plurality of receive parameters corresponding to the one or more target reference signal resources, and determine an antenna panel that is of the communications apparatus and that separately corresponds to the plurality of receive parameters, where the one or more target reference signal resources are a part or all of the one or more reference signal resources, and the plurality of receive parameters include the first receive parameter and the second receive parameter.

The sending unit 530 is configured to send beam measurement information to the network device, where the beam measurement information is used to indicate the one or more target reference signal resources and the antenna panel that is of the communications apparatus and that separately corresponds to the one or more target reference signal resources.

In an embodiment, the sending unit 530 is configured to send beam switching capability information to the network device, where the beam switching capability information is used to indicate a first switching time required for switching between any two beams on a same antenna panel of the communications apparatus and a second switching time required for switching between any two beams on different antenna panels of the communications apparatus, or the beam information is used to indicate a first switching time required for switching between any two beams on a same antenna panel of the communications apparatus and a third switching time required for switching between any two antenna panels of the communications apparatus.

In an embodiment, the processing unit 520 is configured to:
when the first receive parameter and the second receive parameter belong to a same antenna panel, determine that the beam switching time is the first switching time; or
when the first receive parameter and the second receive parameter belong to different antenna panels, determine that the beam switching time is the second switching time, or determine that the beam switching time is greater than or equal to a sum of the first switching time and the third switching time.

In an embodiment, the control information is further used to indicate a position of the to-be-transmitted signal in time domain; and
the receiving unit is configured to perform one or more of the following:
when the first receive parameter and the second receive parameter belong to a same antenna panel, if a time interval between the position of the to-be-transmitted signal in time domain and a position of the control information in time domain is greater than or equal to the first switching time, receive, by using the second receive parameter, the to-be-transmitted signal at the position of the to-be-transmitted signal in time domain;
when the first receive parameter and the second receive parameter belong to a same antenna panel, if a time interval between the position of the to-be-transmitted signal in time domain and a position of the control information in time domain is less than the first switching time, receive, by using a preset receive parameter, the to-be-transmitted signal at the position of the to-be-transmitted signal in time domain;
when the first receive parameter and the second receive parameter belong to different antenna panels, if a time interval between the position of the to-be-transmitted signal in time domain and a position of the control information in time domain is greater than or equal to the second switching time or is greater than or equal to the sum of the first switching time and the third switching time, receive, by using the second receive parameter, the to-be-transmitted signal at the position of the to-be-transmitted signal in time domain; or
when the first receive parameter and the second receive parameter belong to different antenna panels, if a time interval between the position of the to-be-transmitted signal in time domain and a position of the control information in time domain is less than the second switching time or is less than the sum of the first switching time and the third switching time, receive, by using a preset receive parameter, the to-be-transmitted signal at the position of the to-be-transmitted signal in time domain.

The communications apparatus 500 is a communications device, or may be a chip in a communications device. When the communications apparatus is the communications device, the processing unit may be a processor, the receiving unit and/or the sending unit may be a transceiver. The communications device may further include a storage unit, and the storage unit may be a memory. The storage unit is configured to store an instruction, and the processing unit executes the instruction stored in the storage unit, to perform the method performed by the communications device. When the communications apparatus is the chip in the communications device, the processing unit may be a processor, the receiving unit and/or the sending unit may be an input/output interface, a pin, a circuit, or the like. The processing unit executes an instruction stored in a storage unit, so that the communications apparatus performs an operation performed by the terminal device in the foregoing method. The storage unit may be a storage unit (for example, a register or a cache) in the chip, or may be a storage unit (for example, a read only memory or a random access memory) outside the chip in the communications device.

It may be clearly understood by a person skilled in the art that, for steps performed by the communications apparatus 500 and corresponding beneficial effects, refer to related descriptions of the terminal device in the foregoing method. For brevity, details are not described herein again.

Figure 6:
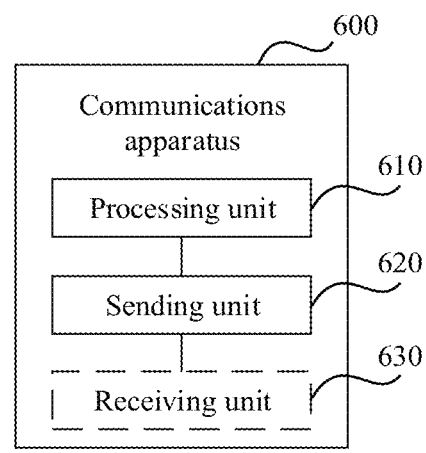
FIG. 6 is a schematic structural diagram of a communications apparatus according to an embodiment.

FIG. 6 is a schematic structural diagram of a communications apparatus according to an embodiment. The communications apparatus 600 includes a processing unit 610 and a sending unit 620. In an embodiment, the communications apparatus 600 may further include a receiving unit 630. The processing unit 610 is configured to determine, based on an antenna panel to which a first receive parameter belongs and an antenna panel to which a second receive parameter belongs, a beam switching time required by a terminal device to switch from the first receive parameter to the second receive parameter, where the first receive parameter is used by the terminal device to receive control information, and the second receive parameter is used by the terminal device to receive a to-be-transmitted signal.

The processing unit 610 is further configured to determine a position of the to-be-transmitted signal in time domain based on the beam switching time.

The sending unit 620 is configured to send the control information to the terminal device, where the control information is used to indicate the second receive parameter and the position of the to-be-transmitted signal in time domain.

The sending unit 620 is further configured to send the to-be-transmitted signal to the terminal device based on the position of the to-be-transmitted signal in time domain.

In an embodiment, the sending unit 620 is further configured to:
  send reference signals by using one or more reference signal resources; and
  the receiving unit 630 is configured to receive beam measurement information sent by the terminal device, where the beam measurement information is used to indicate one or more target reference signal resources and one or more antenna panels that is of the terminal device and that separately corresponds to the one or more target reference signal resources, the one or more target reference signal resources are a part or all of the one or more reference signal resources, the one or more target reference signal resources correspond to a plurality of receive parameters, and the plurality of receive parameters include the first receive parameter and the second receive parameter.

In an embodiment, the receiving unit 630 is configured to receive beam switching capability information sent by the terminal device, where the beam switching capability information is used to indicate a first switching time required for switching between any two beams on a same antenna panel of the terminal device and a second switching time required for switching between any two beams on different antenna panels of the terminal device, or the beam information is used to indicate a first switching time required for switching between any two beams on a same antenna panel of the terminal device and a third switching time required for switching between any two antenna panels of the terminal device.

In an embodiment, the processing unit 610 is configured to:
  when the first receive parameter and the second receive parameter belong to a same antenna panel, determine that the beam switching time is the first switching time; or
  when the first receive parameter and the second receive parameter belong to different antenna panels, determine that the beam switching time is the second switching time, or determine that the beam switching time is greater than or equal to a sum of the first switching time and the third switching time.

In an embodiment, the processing unit 610 is configured to:
  when the first receive parameter and the second receive parameter belong to a same antenna panel, determine that a time interval between the position of the first transmission signal in time domain and a position of the control information in time domain is greater than or equal to the first switching time; and/or
  when the first receive parameter and the second receive parameter belong to different antenna panels, determine that a time interval between the position of the first transmission signal in time domain and a position of the control information in time domain is greater than or equal to the second switching time, or is greater than or equal to the sum of the first switching time and the third switching time.

The control information is downlink control information (DCI), and the to-be-transmitted signal is physical downlink shared channel (PDSCH).

The communications apparatus 600 is a communications device, or may be a chip in a communications device. When the communications apparatus is the communications device, the processing unit may be a processor, the receiving unit and/or the sending unit may be a transceiver. The communications device may further include a storage unit, and the storage unit may be a memory. The storage unit is configured to store an instruction, and the processing unit executes the instruction stored in the storage unit, to perform the method performed by the communications device. When the apparatus is the chip in the communications device, the processing unit may be a processor, the receiving unit and/or the sending unit may be an input/output interface, a pin, a circuit, or the like. The processing unit executes an instruction stored in a storage unit, so that the communications apparatus performs an operation performed by the network device in the foregoing method. The storage unit may be a storage unit (for example, a register or a cache) in the chip, or may be a storage unit (for example, a read only memory or a random access memory) outside the chip in the communications device.

It may be clearly understood by a person skilled in the art that, for steps performed by the communications apparatus

600 and corresponding beneficial effects, refer to related descriptions of the network device in the foregoing method. For brevity, details are not described herein again.

The network device and the terminal device in the foregoing apparatus embodiments completely correspond to the network device and the terminal device in the method embodiment. A corresponding module or unit performs a corresponding step. For example, the sending unit (transmitter) performs a sending step in the method embodiment, the receiving unit (receiver) performs a receiving step in the method embodiment, and another step other than the sending step and the receiving step may be performed by the processing unit (processor). For a function of a specific unit, refer to the corresponding method embodiment. The sending unit and the receiving unit may form a transceiver unit, and the transmitter and the receiver may form a transceiver, to jointly implement receiving and sending functions. There may be one or more processors.

It should be understood that division of the foregoing units is merely function division, and there may be another division method during actual implementation.

It may be clearly understood by a person skilled in the art that, for a detailed working process of the foregoing apparatus and unit, and for technical effects generated by performing the steps, refer to corresponding descriptions in the foregoing method embodiment. For brevity, details are not described herein again.

The terminal device or the network device may be a chip, and the processing unit may be implemented by hardware or software. When being implemented by the hardware, the processing unit may be a logic circuit, an integrated circuit, or the like. When being implemented by the software, the processing unit may be a general-purpose processor, and is implemented by reading software code stored in a storage unit. The storage unit may be integrated into the processor, or may be located outside the processor and exist independently.

Figure 7:
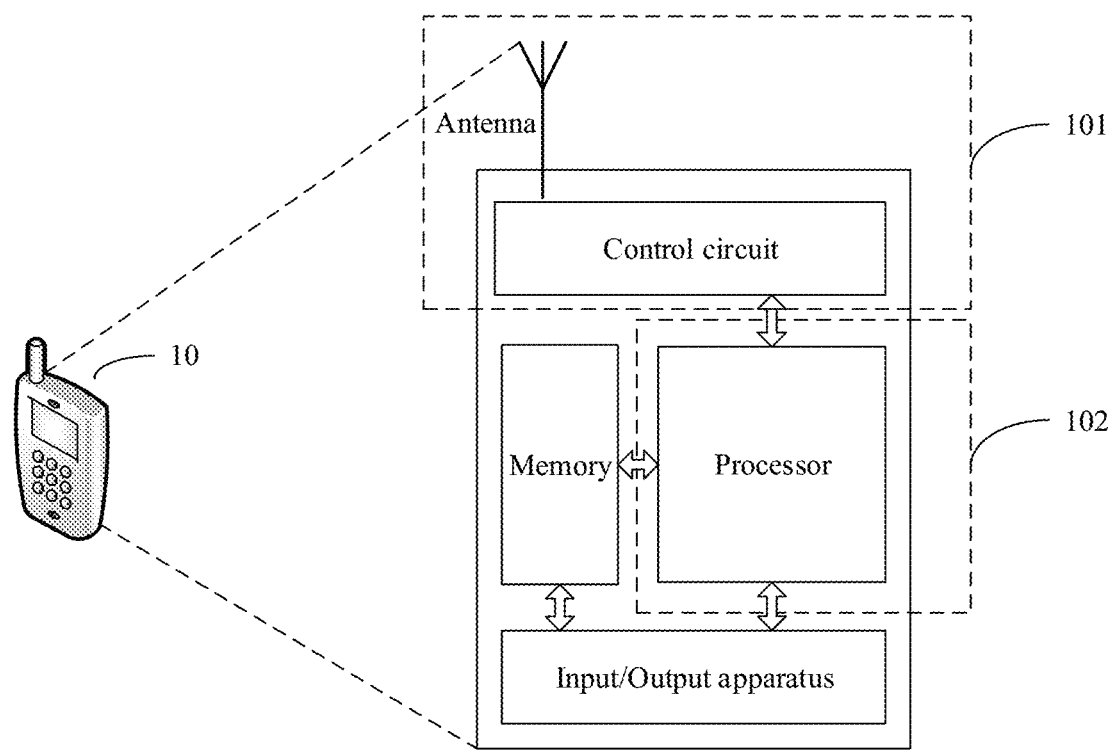
FIG. 7 is a schematic structural diagram of a terminal device according to an embodiment.

FIG. 7 is a schematic structural diagram of a terminal device according to an embodiment. For ease of description, FIG. 7 shows only main components of the terminal device. As shown in FIG. 7, terminal device 10 includes a processor, a memory, a control circuit, an antenna, and an input/output apparatus.

The processor is mainly configured to: process a communications protocol and communication data, control the entire terminal device, execute a software program, and process data of the software program, for example, is configured to support the terminal device in performing an action described in the foregoing embodiment of the communication method. The memory is mainly configured to store the software program and the data, for example, store the QCL information or the TCI state in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus such as a touchscreen, a display, or a keyboard is mainly configured to receive data entered by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and one processor. An actual terminal device may have a plurality of processors and a plurality of memories. The memory may also be referred to as a storage medium, a storage device, or the like. This is not limited in the embodiments of this application.

In an embodiment, the processor may include a baseband processor and a central processing unit. The baseband processor is mainly configured to process a communications protocol and communication data. The central processing unit is mainly configured to control the entire terminal device, execute a software program, and process data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

For example, in this embodiment, the antenna and the control circuit that have receiving and sending functions may be considered as a transceiver unit 101 of the terminal device 10, and the processor having a processing function may be considered as a processing unit 102 of the terminal device 10. As shown in FIG. 7, the terminal device 10 includes the transceiver unit 101 and the processing unit 102. The transceiver unit may also be referred to as a transceiver, a transceiver machine, a transceiver apparatus, or the like. In an embodiment, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like.

The terminal device shown in FIG. 7 may perform actions performed by the terminal device in the foregoing method. To avoid repeated descriptions, detailed descriptions thereof are omitted herein.

Figure 8:
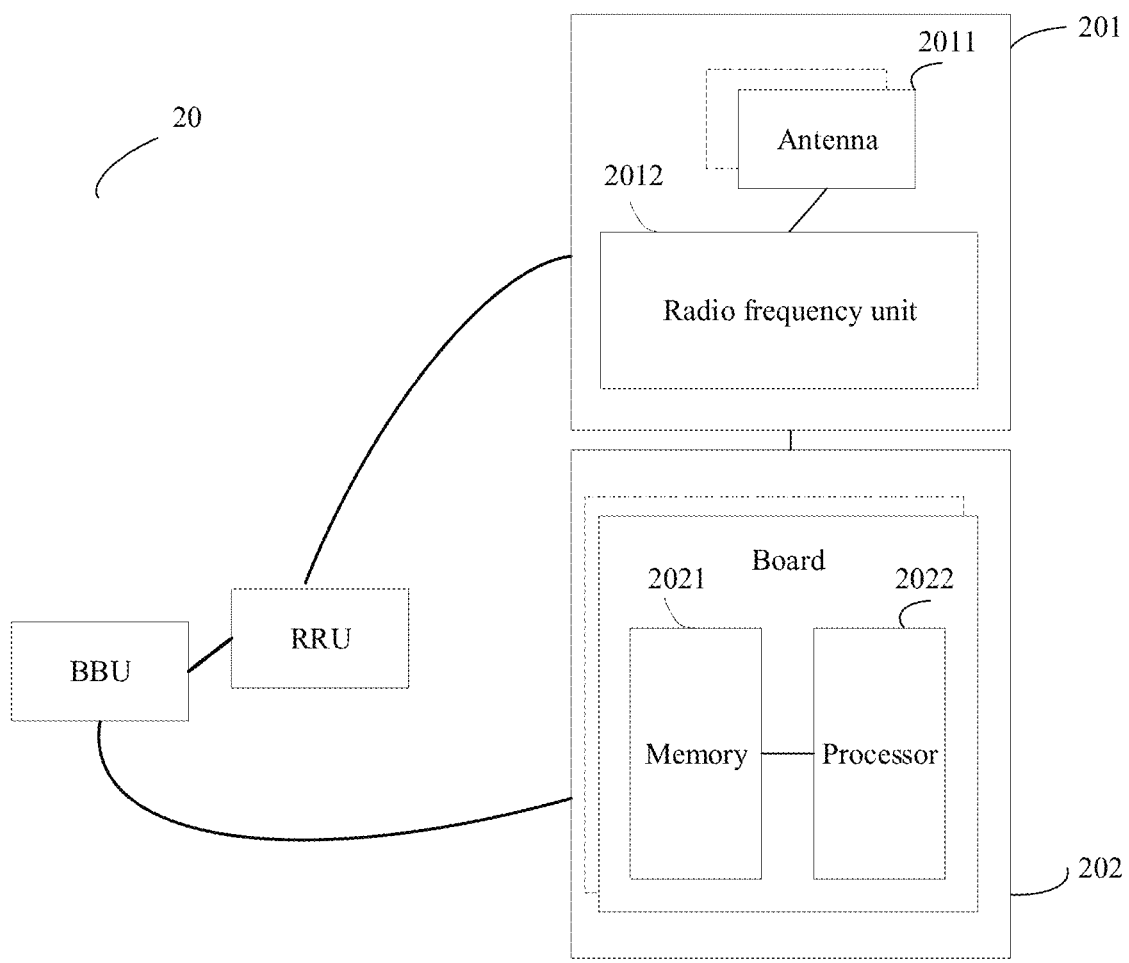
FIG. 8 is a schematic structural diagram of a network device according to an embodiment.

FIG. 8 is a schematic structural diagram of a network device according to an embodiment. The network device may be, for example, a base station. As shown in FIG. 8, the base station may be applied to the communications system shown in FIG. 1, and perform a function of the network device in the method embodiment. The base station 20 may include one or more radio frequency units, such as a remote radio unit (RRU) 201 and one or more baseband units (BBU) (which may also be referred to as a digital unit (DU)) 202. The RRU 201 may be referred to as a transceiver unit, a transceiver machine, a transceiver circuit, a transceiver, or the like, and may include at least one antenna 2011 and a radio frequency unit 2012. The RRU 201 part is mainly configured to perform receiving and sending of a radio frequency signal and conversion between a radio frequency signal and a baseband signal, for example, configured to send the PDCCH and/or the PDSCH in the foregoing method embodiment. The BBU 202 part is mainly configured to perform baseband processing, control the base station, and the like. The RRU 201 and the BBU 202 may be physically disposed together, or may be physically separated, that is, in a distributed base station.

The BBU 202 is a control center of the base station, may also be referred to as a processing unit, and is mainly configured to complete baseband processing functions such as channel coding, multiplexing, modulation, and spectrum spreading. For example, the BBU (the processing unit) 202 may be configured to control the base station to perform an operation procedure related to the network device in the method embodiment.

In an embodiment, the BBU 202 may include one or more boards. A plurality of boards may jointly support a radio access network (such as an LTE network) of a single access standard, or may separately support radio access networks (such as an LTE network, a 5G network, or another network) of different access standards. The BBU 202 further includes a memory 2021 and a processor 2022. The memory 2021 is configured to store a necessary instruction and necessary data. For example, the memory 2021 stores the QCL information or the TCI state in the foregoing method embodiment. The processor 2022 is configured to control the base station to perform a necessary action, for example, is configured to control the base station to perform an operation procedure related to the network device in the foregoing method embodiment. The memory 2021 and the processor 2022 may serve the one or more boards. In other words, a memory and a processor may be independently disposed on each board. Alternatively, a plurality of boards may share a same memory and a same processor. In addition, a necessary circuit may be further disposed on each board.

This application further provides a communications system, including the foregoing one or more network devices and the foregoing one or more terminal devices.

It should be noted that the processor in the embodiments of this application may be an integrated circuit chip, and has a signal processing capability. In an implementation process, the steps in the foregoing method embodiment may be completed by using a hardware integrated logic circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The method, the steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing method in combination with hardware of the processor.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. According to a description that is used as an example instead of a limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification aims to include but is not limited to these memories and any memory of another proper type.

This application further provides a computer-readable medium. The computer-readable medium stores a computer program. When the computer program is executed by a computer, a function in any one of the foregoing method embodiments is implemented.

This application further provides a computer program product. When the computer program product is executed by a computer, a function in any one of the foregoing method embodiments is implemented.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the "embodiment" mentioned in the entire specification means that particular features, structures, or characteristics related to the embodiment are included in at least one embodiment of this application. Therefore, the embodiments in the entire specification do not necessarily refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should also be understood that, in this application, "when" and "if" mean that the UE or the base station performs corresponding processing in an objective situation, and are not intended to limit time, and the UE or the base station is not necessarily required to have a determining action during implementation, and do not mean any other limitation.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of" or "at least one type of" in this specification indicates all or any combination of the listed items. For example, "at least one of A, B, and C" may represent the following six cases: Only A exists, only B exists, only C exists, both A and B exist, both B and C exist, and A, B, and C all exist.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists. A and B may be singular or plural. The character "/" usually represents an "or" relationship between the associated objects. "At least one item (piece) of the following" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

It should be understood that in the embodiments of this application, "B corresponding to A" represents that B is associated with A, and B may be determined based on A. However, it should further be understood that determining B based on A does not mean that B is determined based on A only, and B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

With descriptions of the foregoing embodiments, a person skilled in the art may clearly understand that this application may be implemented by hardware, firmware or a combination thereof. When this application is implemented by software, the foregoing functions may also be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM or another optical disc storage, a disk storage medium or another magnetic storage device, or any other medium that can carry or store expected program code in a form of an instruction or a data structure and that can be accessed by a computer. In addition, any connection may be properly defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio, and microwave are included in fixation of a medium to which they belong. For example, a disk and a disc used in this application include a compact disc (CD), a laser disc, an optical disc, a digital versatile disc (DVD), a floppy disk, and a Blu-ray disc. The disk usually copies data in a magnetic manner, and the disc copies data by using a laser. Combinations of the foregoing media should also be included in the protection scope of the computer-readable medium.

In conclusion, the foregoing descriptions are merely example embodiments of the technical solutions of this application, but are not intended to limit the protection scope of this application. Any modification, equivalent replacement, and improvement made without departing from the spirit and principle of this application shall fall within the protection scope of this application.

The invention claimed is:
1. A communication method, comprising:
 receiving, by a terminal device, reference signals from a network device by using one or more reference signal resources;

determining, by the terminal device based on a measurement of the reference signals, one or more target reference signal resources and a plurality of receive parameters corresponding to the one or more target reference signal resources, and determining one or more antenna panels of the terminal device that separately correspond to the plurality of receive parameters, wherein the one or more target reference signal resources are a part or all of the one or more reference signal resources; and sending, by the terminal device, beam measurement information to the network device, wherein the beam measurement information indicates the one or more target reference signal resources and the one or more antenna panels of the terminal device that separately correspond to the plurality of receive parameters.

2. The communication method according to claim 1, wherein the beam measurement information comprises indexes of the one or more target reference signal resources and indexes of the one or more antenna panels of the terminal device corresponding to the plurality of receive parameters.

3. The communication method according to claim 1, wherein the plurality of receive parameters comprise a first receive parameter and a second receive parameter;

the communication method further comprises:

receiving, by the terminal device by using the first receive parameter, control information from the network device, wherein the control information indicates the second receive parameter that is used by the terminal device to receive a to-be-transmitted signal;

determining, by the terminal device based on a first antenna panel to which the first receive parameter belongs and a second antenna panel to which the second receive parameter belongs, a beam switching time required for switching from the first receive parameter to the second receive parameter; and receiving, by the terminal device, the to-be-transmitted signal based on the beam switching time.

4. The communication method according to claim 3, further comprising: before receiving the control information from the network device, sending, by the terminal device, beam switching capability information to the network device, wherein the beam switching capability information indicates a first switching time required for switching between any two beams on a same antenna panel of the terminal device and a second switching time required for switching between any two beams on different antenna panels of the terminal device, or the beam switching capability information indicates a first switching time required for switching between any two beams on the same antenna panel of the terminal device and a third switching time required for switching between any two antenna panels of the terminal device.

5. The communication method according to claim 4, wherein determining the beam switching time required for switching from the first receive parameter to the second receive parameter comprises:

when the first receive parameter and the second receive parameter belong to the same antenna panel, determining, by the terminal device, that the beam switching time is the first switching time; or when the first receive parameter and the second receive parameter belong to the different antenna panels, determining, by the terminal device, that the beam switching time is the second switching time, or determining, by the terminal device, that the beam switching time is greater than or equal to a sum of the first switching time and the third switching time.

6. A communication method, comprising:

sending, by a network device, reference signals by using one or more reference signal resources; and receiving, by the network device, beam measurement information from a terminal device, wherein the beam measurement information indicates one or more target reference signal resources and one or more antenna panels of the terminal device that separately correspond to a plurality of receive parameters, the one or more target reference signal resources are a part or all of the one or more reference signal resources, and the one or more target reference signal resources correspond to the plurality of receive parameters.

7. The communication method according to claim 6, wherein the beam measurement information comprises indexes of the one or more target reference signal resources and indexes of the one or more antenna panels of the terminal device corresponding to the plurality of receive parameters.

8. The communication method according to claim 6, wherein the plurality of receive parameters comprise a first receive parameter and a second receive parameter;

the communication method further comprises:

determining, by the network device based on the beam measurement information, a first antenna panel to which the first receive parameter belongs and a second antenna panel to which the second receive parameter belongs;

determining, by the network device based on the first antenna panel and the second antenna panel, a beam switching time required by the terminal device to switch from the first receive parameter to the second receive parameter, wherein the first receive parameter is used by the terminal device to receive control information, and the second receive parameter is used by the terminal device to receive a to-be-transmitted signal;

determining, by the network device, a position of the to-be-transmitted signal in time domain based on the beam switching time;

sending, by the network device, the control information to the terminal device, wherein the control information indicates the second receive parameter and the position of the to-be-transmitted signal in time domain; and sending, by the network device, the to-be-transmitted signal to the terminal device based on the position of the to-be-transmitted signal in time domain.

9. The communication method according to claim 8, further comprising: before determining the beam switching time required by the terminal device to switch from the first receive parameter to the second receive parameter, receiving, by the network device, beam switching capability information from the terminal device, wherein the beam switching capability information indicates a first switching time required for switching between any two beams on a same antenna panel of the terminal device and a second switching time required for switching between any two beams on different antenna panels of the terminal device, or the beam switching capability information indicates the first switching time required for switching between any two beams on the same antenna panel of the terminal device and a third switching time required for switching between any two antenna panels of the terminal device.

10. The communication method according to claim 9, wherein determining the beam switching time required by the terminal device to switch from the first receive parameter to the second receive parameter comprises:
when the first receive parameter and the second receive parameter belong to the same antenna panel, determining, by the network device, that the beam switching time is the first switching time; or
when the first receive parameter and the second receive parameter belong to the different antenna panels, determining, by the network device, that the beam switching time is the second switching time, or determining, by the network device, that the beam switching time is greater than or equal to a sum of the first switching time and the third switching time.

11. A communications apparatus, wherein the communications apparatus is a terminal device or a chip of the terminal device, the communications apparatus comprising:
a receiver, configured to receive reference signals from a network device by using one or more reference signal resources;
a processor configured to determine, based on a measurement of the reference signals, one or more target reference signal resources and a plurality of receive parameters corresponding to the one or more target reference signal resources, and determining one or more antenna panels of the terminal device that separately correspond to the plurality of receive parameters, wherein the one or more target reference signal resources are a part or all of the one or more reference signal resources; and
a transmitter configured to send beam measurement information to the network device, wherein the beam measurement information indicates the one or more target reference signal resources and the one or more antenna panels of the terminal device that separately correspond to the plurality of receive parameters.

12. The communications apparatus according to claim 11, wherein the beam measurement information comprises indexes of the one or more target reference signal resources and indexes of the one or more antenna panels of the terminal device corresponding to the plurality of receive parameters.

13. The communications apparatus according to claim 11, wherein
the plurality of receive parameters comprise a first receive parameter and a second receive parameter;
the receiver is further configured to receive, by using the first receive parameter, control information from the network device, wherein the control information indicates the second receive parameter that is used by the terminal device to receive a to-be-transmitted signal;
the processor is further configured to determine, based on a first antenna panel to which the first receive parameter belongs and a second antenna panel to which the second receive parameter belongs, a beam switching time required for switching from the first receive parameter to the second receive parameter; and
the receiver is further configured to receive the to-be-transmitted signal based on the beam switching time.

14. The communications apparatus according to claim 13, wherein:
the transmitter is further configured to send beam switching capability information to the network device, wherein the beam switching capability information indicates a first switching time required for switching between any two beams on a same antenna panel of the terminal device and a second switching time required for switching between any two beams on different antenna panels of the terminal device, or the beam switching capability information indicates a first switching time required for switching between any two beams on the same antenna panel of the terminal device and a third switching time required for switching between any two antenna panels of the terminal device.

15. The communications apparatus according to claim 14, wherein to determine the beam switching time required for switching from the first receive parameter to the second receive parameter, the processor is configured to:
when the first receive parameter and the second receive parameter belong to the same antenna panel, determine that the beam switching time is the first switching time; or
when the first receive parameter and the second receive parameter belong to the different antenna panels, determine that the beam switching time is the second switching time, or the beam switching time is greater than or equal to a sum of the first switching time and the third switching time.

16. A communications apparatus, wherein the communications apparatus is a network device or a chip of the network device, the communications apparatus comprising:
a transmitter configured to send reference signals by using one or more reference signal resources; and
a receiver configured to receive beam measurement information from a terminal device, wherein the beam measurement information indicates one or more target reference signal resources and one or more antenna panels of the terminal device that separately correspond to a plurality of receive parameters, the one or more target reference signal resources are a part or all of the one or more reference signal resources, and the one or more target reference signal resources correspond to the plurality of receive parameters.

17. The communications apparatus according to claim 16, wherein the beam measurement information comprises indexes of the one or more target reference signal resources and indexes of the one or more antenna panels of the terminal device corresponding to the plurality of receive parameters.

18. The communications apparatus according to claim 16, wherein
the plurality of receive parameters comprise a first receive parameter and a second receive parameter;
the communications apparatus further comprises a processor configured to:
determine, based on the beam measurement information, a first antenna panel to which the first receive parameter belongs and a second antenna panel to which the second receive parameter belongs;
determine, based on the first antenna panel and the second antenna panel, a beam switching time required by the terminal device to switch from the first receive parameter to the second receive parameter, wherein the first receive parameter is used by the terminal device to receive control information, and the second receive parameter is used by the terminal device to receive a to-be-transmitted signal; and
determine a position of the to-be-transmitted signal in time domain based on the beam switching time;
the transmitter is further configured to:

send the control information to the terminal device, wherein the control information indicates the second receive parameter and the position of the to-be-transmitted signal in time domain; and send the to-be-transmitted signal to the terminal device based on the position of the to-be-transmitted signal in time domain.

19. The communications apparatus according to claim 18, wherein:
the receiver is further configured to receive beam switching capability information from the terminal device, wherein the beam switching capability information indicates a first switching time required for switching between any two beams on a same antenna panel of the terminal device and a second switching time required for switching between any two beams on different antenna panels of the terminal device, or the beam switching capability information indicates the first switching time required for switching between any two beams on the same antenna panel of the terminal device and a third switching time required for switching between any two antenna panels of the terminal device.

20. The communications apparatus according to claim 19, wherein to determine the beam switching time required by the terminal device to switch from the first receive parameter to the second receive parameter, the processor is configured to:
when the first receive parameter and the second receive parameter belong to the same antenna panel, determine that the beam switching time is the first switching time; or
when the first receive parameter and the second receive parameter belong to the different antenna panels, determine that the beam switching time is the second switching time, or the beam switching time is greater than or equal to a sum of the first switching time and the third switching time.

* * * * *